United States Patent
Kawai et al.

[11] Patent Number: 5,339,365
[45] Date of Patent: Aug. 16, 1994

[54] IMAGE PROCESSING APPARATUS CAPABLE OF USING FUZZY LOGIC

[75] Inventors: Takashi Kawai; Kenichi Outa, both of Yokohama, Japan

[73] Assignee: Canon Kabushiki Kaisha, Tokyo, Japan

[21] Appl. No.: 572,419

[22] Filed: Aug. 27, 1990

[30] Foreign Application Priority Data

Aug. 31, 1989 [JP] Japan .................. 1-225342
Aug. 31, 1989 [JP] Japan .................. 1-225352

[51] Int. Cl.⁵ .................................... G06K 9/36
[52] U.S. Cl. ........................ 382/54; 382/22; 382/1
[58] Field of Search ............. 382/54, 51, 52, 22, 382/23, 31; 358/448, 452

[56] References Cited

U.S. PATENT DOCUMENTS

| | | | |
|---|---|---|---|
| 4,194,221 | 3/1980 | Stoffel | 358/283 |
| 4,477,829 | 10/1984 | Ziman et al. | 382/31 |
| 4,689,666 | 8/1987 | Hatanaka | 358/36 |
| 4,783,840 | 11/1988 | Song | 382/54 |
| 4,845,762 | 7/1989 | Higashi et al. | 382/54 |
| 4,849,914 | 7/1989 | Medioni et al. | 382/54 |
| 4,860,373 | 8/1989 | Hartless et al. | 382/54 |
| 4,908,876 | 3/1990 | De Forest et al. | 382/31 |
| 4,953,114 | 8/1990 | Sato | 382/50 |
| 4,956,869 | 9/1990 | Miyatake et al. | 382/22 |
| 4,972,499 | 11/1990 | Kurosawa | 382/22 |
| 4,974,261 | 11/1990 | Nakahara et al. | 382/22 |
| 5,003,616 | 3/1991 | Orita et al. | 382/54 |
| 5,003,618 | 3/1991 | Meno | 382/54 |
| 5,016,173 | 5/1991 | Kenet et al. | 382/22 |

OTHER PUBLICATIONS

*Patent Abstracts of Japan*, vol. 6, No. 30 (for Kokai 56-149674).
"Expert Systems for Image Processing Knowledge—Based Composition of Image Analysis Processes", in 9th Intl. Conf. on Pattern Recognition, vol. 1 pp. 125–133.
"Blm Identification Using the Expectation-Maximization Algorithm", Intl. Conf. on Acoustics Speech and Signal Processing, vol. 3, pp. 1397–1400.

*Primary Examiner*—David K. Moore
*Attorney, Agent, or Firm*—Fitzpatrick, Cella, Harper & Scinto

[57] ABSTRACT

There is provided an image processing apparatus comprising: an input device to input an image signal; a processor for processing the input image signal and outputting an image reproduction signal; a detecting circuit to detect characteristics of the input image signal; and a control circuit to control conditions of processing of the image signal by the processor by means of a fuzzy inference based on characteristics of the image signal which were detected by the detecting circuit. Such characteristics of the image signal include the kind of image such as character, screen, and photograph. The optimum spatial filtering process can be executed for areas of each of the character, screen, and photograph types. A mixing ratio of the edge emphasis and the smoothing can be continuously changed for characteristic amounts of an original. Membership functions of a plurality of parameters are synthesized and a consequence is derived by the fuzzy inference algorithm. Thus, erroneous judgment for a vague image area is prevented and discontinuity which occurs at a change point of the image processes can be also eliminated.

30 Claims, 17 Drawing Sheets

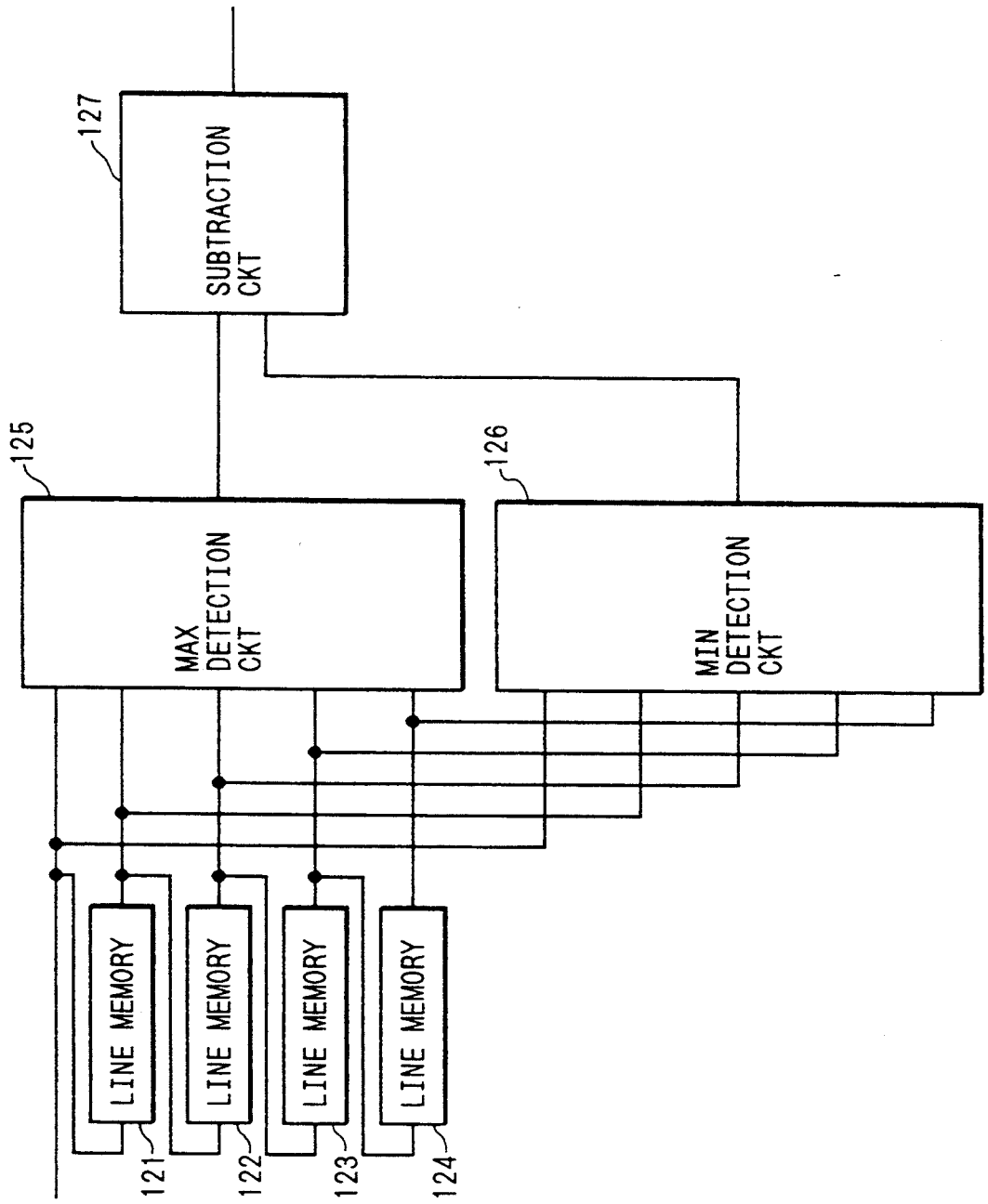

FIG. 2A

| 1/9 | 1/9 | 1/9 |
|-----|-----|-----|
| 1/9 | 1/9 | 1/9 |
| 1/9 | 1/9 | 1/9 |

$X\alpha$

| -1 | -1 | -1 |
|----|----|----|
| -1 | 9  | -1 |
| -1 | -1 | -1 |

$X(1-\alpha)$

FIG. 2C

| 0 | 0 | 0 |
|---|---|---|
| 0 | 1 | 0 |
| 0 | 0 | 0 |

$\alpha = \dfrac{9}{10}$

FIG. 5A  $\times \alpha$

FIG. 5B  $\times (1-\alpha)$

FIG. 5C  $\alpha = \frac{19}{20}$

FIG. 7A
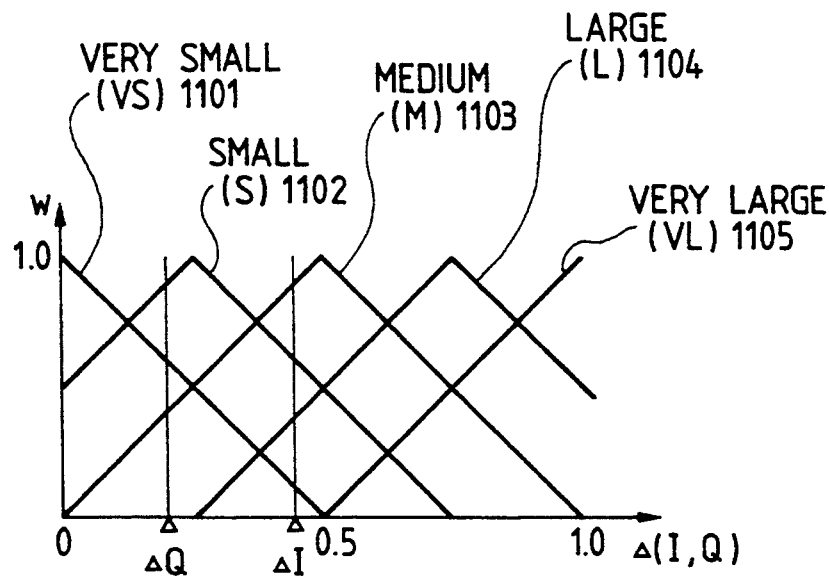
FIG. 7B
① IF(I = VS) AND (Q = VS) THEN (v = VL)
② IF(I = S ) AND (Q = S ) THEN (v = L )
③ IF(I = M ) AND (Q = M ) THEN (v = M )
④ IF(I = L ) AND (Q = L ) THEN (v = S )
⑤ IF(I = VL) AND (Q = VL) THEN (v = VS)
FIG. 7C
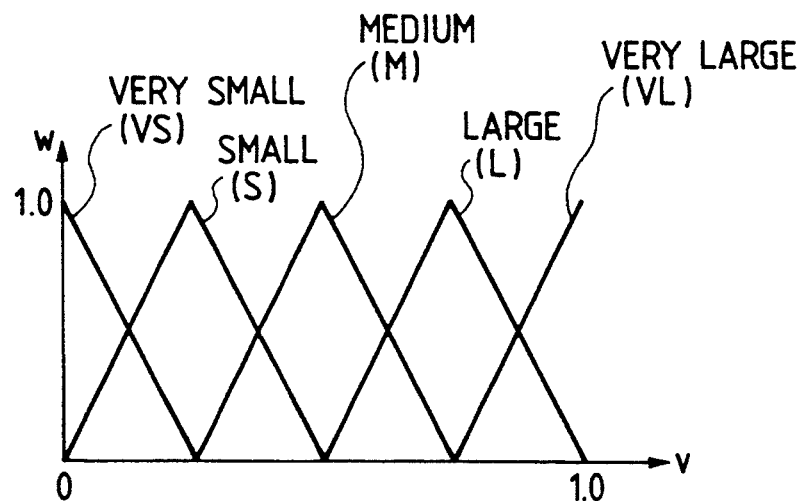

IMAGE PROCESSING APPARATUS CAPABLE OF USING FUZZY LOGIC

BACKGROUND OF THE INVENTION

1. Field of the Invention

The present invention relates to an image processing apparatus for executing a predetermined processing on an input image and for outputting the processed image.

2. Related Background Art

Hitherto, there has existed an apparatus for executing image processes such that a spatial frequency filtering process is digitally executed on input image data, spatial frequency characteristics are changed and the processed data is output. As such an apparatus, a technique in which an input image is separated into three kinds of original, character original, screen (or dot) original, and photograph original and different respective processes are executed them, has been shown in U.S. Pat. No. 4,194,221. On the other hand, a technique in which an edge emphasis process and smoothing filtering process are switched in accordance with an original has been proposed in U.S. Pat. No. 4,953,114, assigned to the same assignee as is the present invention.

However, according to the above conventional technique, for instance, in the case where the kind of input image has been erroneously discriminated, there is a fear that a character of an output image may become extremely dull, the miré of any screen used may be emphasized, or the like, so that the picture quality is remarkably deteriorated. On the other hand, there is a case where, in a portion where the kind of image changes, the picture quality suddenly changes, so that the output image cannot be seen well.

Generally, in a color image copying apparatus, color separation signals of R (red), G (green), and B (blue) are input from an image input device and are subjected to processing such as luminance (light amount)—density conversion, masking, and the like, and a processed image is printed and recorded by an image output device by an ink jet method or an electrophotographic method. In the masking process, color signals of Y (yellow), M (magenta), C (cyan), and K (black) are obtained by matrix calculations from density signals $D_r$, $D_g$, and $D_b$ after the density conversion. However, ordinarily, the optimization of masking coefficients $a_{ij}$, that is, the non-linear masking, is executed by a method of least squares or the like so as to minimize the color differences within a color reproduction range by using high-order terms such as $D_r D_g$, $D_g D_b$, $D_b D_r$, $D_r^2$, $D_g^2$, $D_b^2$, and the like as well as $D_r$, $D_g$, and $D_b$ in consideration of the non-linearity or the like of the image reproducing characteristics of the printer.

$$\begin{pmatrix} Y \\ M \\ C \\ K \end{pmatrix} = \begin{pmatrix} a_{11} & a_{11} & \cdots & a \\ a_{41} & a_{42} & \cdots & a \end{pmatrix} \begin{pmatrix} D_r \\ D_g \\ D_b \\ D_r^2 \\ D_g^2 \\ D_b^2 \\ D_r \cdot D_g \\ D_g \cdot D_b \\ D_r \cdot D_b \end{pmatrix} \quad (1)$$

On the other hand, since the discriminating capability of human beings for achromatic color, flesh tints, or the like is high, an advanced color reproducibility is required for a copy image with regard to an original including such colors.

However, according to the above conventional technique, in order to raise the reproducibility of the achromatic color, skin color, or the like and to realize a sufficient color reproducibility in the whole color reproduction range, the masking process including the terms of higher order must be executed. Thus, there are drawbacks in that the masking circuit becomes complicated and determining the optimum coefficients becomes troublesome.

On the other hand, there are circumstances such that there are individual differences in the degree when colors such as achromatic color, skin color, or the like are perceived by the visual sense of human beings and such degree is dominated by vague parameters based on subjectivity to a certain extent.

SUMMARY OF THE INVENTION

The present invention is made in consideration of the foregoing circumstances, and it is an object of the invention to provide an image processing apparatus which can eliminate the drawbacks of the conventional techniques as mentioned above.

Another object of the invention is to execute a proper image process in accordance with a feature of an image.

To accomplish the above objects, according to the present invention, there is provided an image processing apparatus comprising: input means for inputting an image signal; processing means for processing the image signal which was input by the input means and for outputting an image reproduction signal; detecting means for detecting a feature of the image signal which was input by the input means; and control means for controlling processing conditions of the image signal by the processing means due to the inference based on the feature of the image signal which was detected by the detecting means.

Still another object of the invention is to execute an advanced image processing by using a fuzzy inference.

To accomplish the above object, according to the invention, there is provided an image processing apparatus comprising: processing means for processing a digital image signal and for outputting an image reproduction signal; extracting means for extracting a plurality of characteristic amounts with respect to the digital image signal; memory means for storing a plurality of rules regarding the relations between the characteristic amounts and processing conditions of the digital image signal by the processing means; and control means for synthesizing the plurality of rules stored in the memory means with respect to each of the digital image signals and for determining the processing conditions.

Still another object of the invention is to properly compensate for spatial frequency characteristics of an image.

To accomplish the above object, according to the invention, there is provided an image processing apparatus comprising: input means for inputting image data; extracting means for extracting a plurality of characteristics of the image which was input by the input means; correcting means for correcting spatial frequency characteristics of the image data in accordance with the characteristics of the image which were extracted by the extracting means; and control means for enabling the corrected characteristics by the correcting means to be continuously changed in accordance with the characteristics of the image.

Further another object of the invention is to improve the color reproducibility.

To accomplish the above object, according to the invention, there is provided an image processing apparatus comprising: input means for inputting a plurality of color component signals; a plurality of correcting means for executing in parallel color corrections of the color component signals which were input by the input means; synthesizing means for synthesizing outputs of the plurality of correcting means at a predetermined ratio; and control means for enabling the ratio which is used when the synthesizing means executes the synthesizing processes to be continuously changed.

Still another object of the invention is to provide an image processing apparatus suitable for high-speed processing and real-time processing.

Yet another object of the invention is to provide a simple hardware construction.

The above and other objects and features of the present invention will become apparent from the following detailed description of the preferred embodiments with reference to the accompanying drawings.

BRIEF DESCRIPTION OF THE DRAWINGS

FIGS. 1A to 1D are block diagrams showing examples of a construction of a preferred embodiment of the present invention;

FIGS. 2A to 2C are diagrams showing examples of a spatial filter;

FIGS. 5A to 5C are diagrams showing other examples of a spatial filter;

FIGS. 7A to 7C are diagrams showing membership functions and rules in the first embodiment of the invention;

DETAILED DESCRIPTION OF THE PREFERRED EMBODIMENTS

The preferred embodiments of the present invention will be described hereinbelow with reference to the drawings.

EMBODIMENT 1

Figure 4:
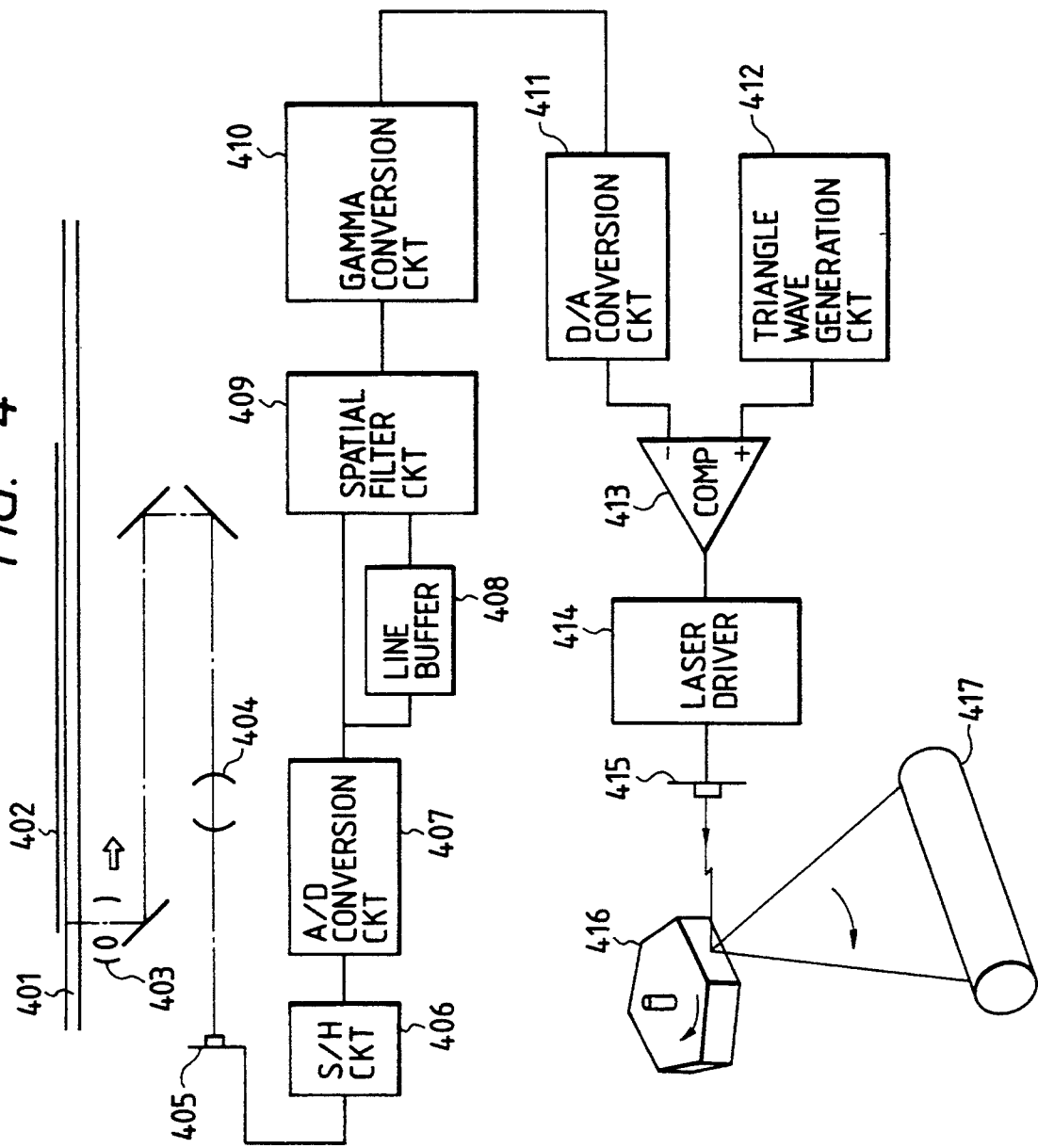
FIG. 4 is a block diagram showing the overall construction of the embodiment of FIG. 1 of the invention.

FIG. 4 shows an example of a construction of an image processing apparatus of the present invention. An original 402 put on an original support glass 401 is irradiated by an irradiating halogen lamp 403 and is scanned in the direction of the arrow. The scanned image is formed on a CCD line sensor 405 by an image forming lens 404 and is converted into an image signal for every line. The output of the CCD is converted into a digital signal every pixel by a sample and hold (S/H) circuit 406 and an A/D conversion circuit 407 and becomes an output of, for instance, eight bits with respect to one pixel. An output of the A/D conversion circuit (A/D converter) 407 is subjected to spatial filtering processes such as smoothing, edge emphasis, and the like by a line buffer 408 and a filter-circuit 409 and is properly gamma corrected by a gamma conversion circuit 410. After that, the signal is sent to a D/A conversion circuit 411 and is again converted into an analog signal. The output of the D/A conversion circuit 411 is compared with an analog triangle wave of one pixel period, which is generated from a triangle wave generation circuit 412, by a comparator 413. The output of the comparator 413 is input to a laser driver 414. A laser 415 is driven by the laser driver 414 by a PWM signal whose pulse width corresponds to a density level of every pixel. A laser beam emitted from the laser 415 is irradiated to a polygonal mirror 416 which rotates at a high speed, so that an image is written onto a photosensitive drum 417. An electrostatic latent image on the photosensitive drum is developed by a developing device (not shown) and is fixed by a fixing device (not shown) so that a copy image is output.

Original images in such a kind of image copying apparatus are mainly classified as one of the following three kinds of originals: a character original; an original such as a silver salt photograph having continuous gradations; and an original such as printed matter which is made by means of microscreen structure. When considering output images for the above various kinds of originals, the sharpness of an output image in the case of a character original is lost as compared with that of the inherent original of the input image due to the influence of the spatial frequency characteristics of the image forming lens system and the CCD. It is desirable to execute a certain kind of edge emphasis by means of the filter circuit 409. In the case of a screen original, the sampling period of the CCD and the period of the screen cause a beat and an unpleasant miré pattern occurs. Therefore, it is desirable to execute a smoothing process by the spatial filter circuit 409. On the other hand, in the case of a photographic original, it corresponds to an intermediate image between the character image and the screen image. If the smoothing process is executed, a photographic image becomes dull as a whole. If the edge emphasis is executed, a photographic image becomes a noisy image. Therefore, it is preferable not to execute the smoothing and edge emphasis for a photographic original.

To eliminate the above drawbacks, for instance, there has been considered a method of switching between edge emphasis and smoothing in accordance with an edge amount (the amount of edge-like structure) present in an input original. However, there is a problem that unnaturalness of the image occurs in the image portion where switching occurs between edge emphasis and smoothing. On the other hand, there has also been considered a method whereby a weighted mean of outputs of two spatial filters which respectively execute edge emphasis and smoothing is calculated at a ratio according to features of an input original. However, the processing obtained on a photographic original, as an intermediate original between the screen image and the character image, is not always clear.

Further, in both of the above methods, there is a problem that in the case where the character portion was determined to be a screen area or, contrarily, the screen portion was decided to be a character area, the image deteriorates such that the character becomes extremely dull or the miré of the screen is emphasized.

Therefore, in the present embodiment, there are provided two kinds of spatial filter circuits in which window sizes for the edge emphasis and the smoothing are equal, and coefficient values are set in a manner such that when both of outputs of the two spatial filter circuits are added at a predetermined ratio, all the filter coefficients of the pixels other than the central pixel are set to 0.

With such set values, the image tone of the original image is identified, a weighted mean of the output of the edge emphasizing means and the output of the smoothing means is calculated at a proper ratio on the basis of the discrimination results, and in the case where the original is determined to be a screen image (or dot image), the ratio for the smoothing is raised. In the case where the original is decided to be a character image, the ratio for the edge emphasis is increased. In the case where the original is determined to be a photographic image, the ratio is set such that all of the filter coefficients of the pixels other than the central pixel are set to 0. If the result of the discrimination indicates an intermediate image among the above three images, the ratio is set to an intermediate value among the above three ratios. In this manner, the deterioration of image due to an erroneous discrimination is prevented.

A construction of the image processing apparatus of a preferred embodiment of the invention will now be described in detail hereinbelow with reference to FIGS. 1A to 1D.

Figure 1A:
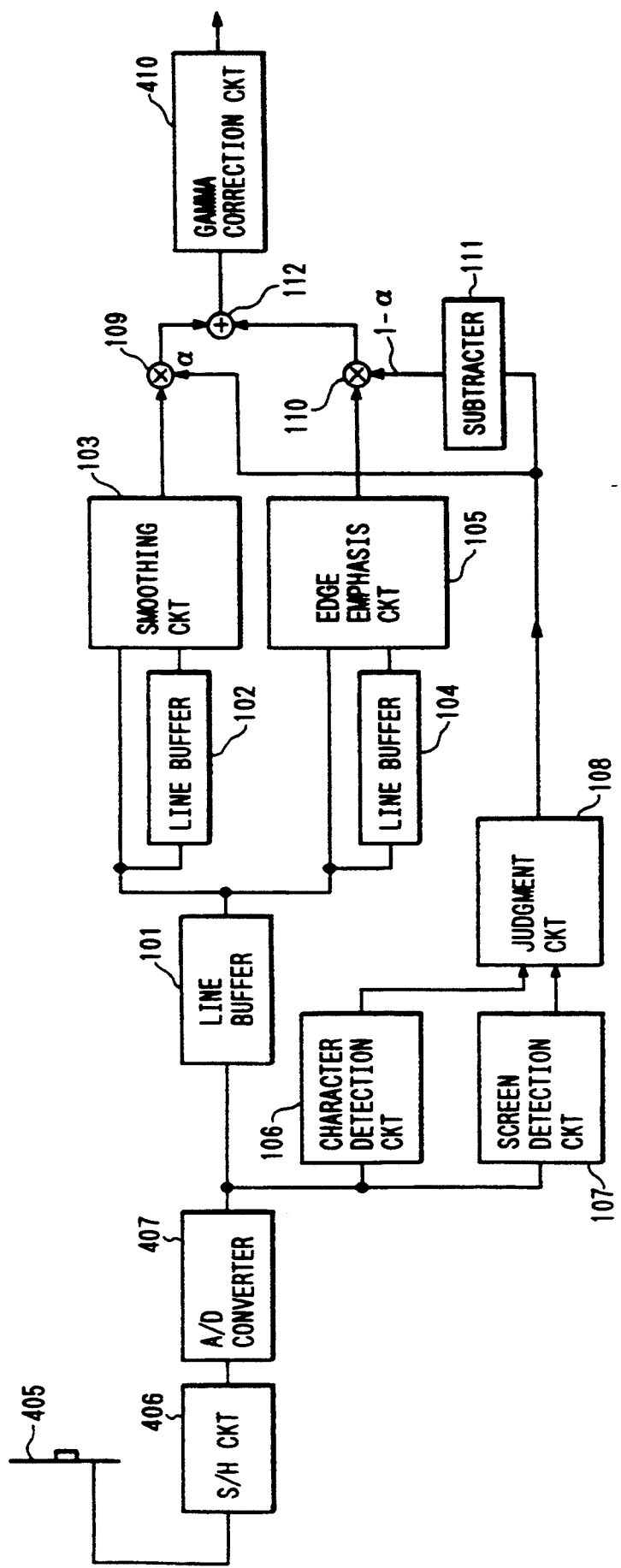

In FIG. 1A, the CCD 405, sample and hold circuit 406, A/D converter (A/D conversion circuit) 407, and gamma conversion circuit 410 are similar to those in FIG. 4 and their descriptions are omitted. The apparatus shown in FIG. 1A also has a construction similar to that shown in FIG. 4 other than the above components. In FIG. 1A, reference numeral 101 denotes a line buffer (memory) of a plurality of lines to delay the image signal of every pixel in order to compensate for the delay of the timing due to the discrimination of the image tone discriminating circuit (elements 106 to 108); 102 and 103 a line buffer and a smoothing circuit to execute the smoothing of an input image; 104 and 105 a line buffer and an edge emphasis circuit to execute edge emphasis; 106 a character detection circuit; 107 a screen detection circuit; and 108 a judgment circuit. The circuits 106, 107, and 108 are used to determine when a target area of the input original is close to the character, screen, and photographic types of image, respectively, and output a weighted mean ratio $\alpha$ used to mix the outputs of the smoothing process and the edge emphasizing process, as a result of the discrimination. The ratio $\alpha$ is multiplied by the smoothing output by a multiplier 109. The value of $(1-\alpha)$ which was calculated by a subtracter 111 is multiplied by the edge emphasis output by a multiplier 110. Reference numeral 112 denotes an adder for adding outputs of the multipliers 109 and 110 and obtaining the weighted mean value. An output of the adder 112 is gamma converted by the gamma conversion circuit 410. After that, a signal of the gamma conversion circuit 410 is output as a copy image in a manner similar to FIG. 4.

The weighted mean ratio $\alpha$ will now be described. It is now assumed that a smoothing filter is as shown in FIG. 2A and an edge emphasis filter is as shown in FIG. 2B and each of the filters has a window size of 3×3. Assuming that an output of the smoothing circuit 103 is set to S and an output of the edge emphasis circuit 105 is set to E, the obtaining of the weighted mean of both of the outputs S and E denotes that Y is obtained by the following calculation (1):

$$Y = \alpha S + (1-\alpha)E \quad (1)$$

where $\alpha$ is a real number between 0 and 1.

The above process will now be considered as it is applied to every pixel before filtering. In the filters of FIGS. 2A and 2B, such a process is equivalent to the calculation (2):

$$y_0 = \frac{1}{9}\alpha + 9(1-\alpha) \quad (2)$$

being executed for the central pixel and that calculation (3):

$$y_1 = \frac{1}{9}\alpha - (1-\alpha) \quad (3)$$

being executed for the peripheral pixels around the central pixel. Now, assuming that $\alpha=9/10$, $y_0=1$ from the equation (2) and $y_1=0$ from the equation (3). In the case where the weighted mean ratio $\alpha$ is set to 9/10, the equation (1) eventually corresponds to a filter of FIG. 2C, is, it is equivalent to that no process being performed on the input image. It will obviously be understood that the case of $\alpha=1$ corresponds to the case of only the smoothing process and that the case of $\alpha=0$ corresponds to the case of only the edge emphasizing process.

Therefore, it is sufficient to construct the image tone discriminating circuit (elements 106 to 108) in a manner such that 1 is output as $\alpha$ if the original is determined to be a screen area, 0 is output as $\alpha$ if the original is identified as a character area, and 9/10 is output as $\alpha$ if the original is determined to be a photographic area. Further, the invention is characterized by the value of $\alpha$ being almost continuously changed from 0 to 1, without completely limiting it to only the three values mentioned above, thereby also eliminating the unnaturalness and discontinuity which appear on the output image at a switching point of $\alpha$, and also preventing image deterioration due to erroneous judgments.

The discriminating circuit to continuously execute judgment as mentioned above will now be described. Reference numerals 106 and 107 denote the well-known character detection circuit and the screen detection circuit.

For instance, an edge detection circuit in which a target pixel is the central pixel can be used as a character detection circuit. In this case, since edge amounts are large in the character area and screen area and small in the photographic area, the edge amount is output as a signal from the character detection circuit 106.

FIG. 1B shows an example of the character detection circuit. Reference numerals 121 to 124 denote line memories each for delaying the image data of one line; 125 indicates a max detection circuit to detect the maximum value in a pixel block of 5×5 in the case where the target pixel is the central pixel; 126 a min detection circuit to detect the minimum value in a pixel block of 5×5 in the case where the target pixel is the central pixel; and 127 a subtraction circuit to calculate the difference between the maximum and minimum values.

An output of the subtraction circuit 127 denotes the edge amount and corresponds to the output of the character detection circuit 106.

As a screen detection circuit 107, it is possible to use a circuit to count the number of pixels which have changed from white to black or from black to white per unit area in the case where the pixels near the target pixel have been binarized by slicing with respect to a predetermined threshold value. In this case, in the screen area, since a number of micro-dots exist, the count value is large. On the other hand, in the character and photograph areas, since the count numbers are small, such a count number can be used as an output of the screen detection circuit 107. However, even in the photograph area, if this area contains fine noise components, there is a possibility that the count number will be large.

Figure 1C:
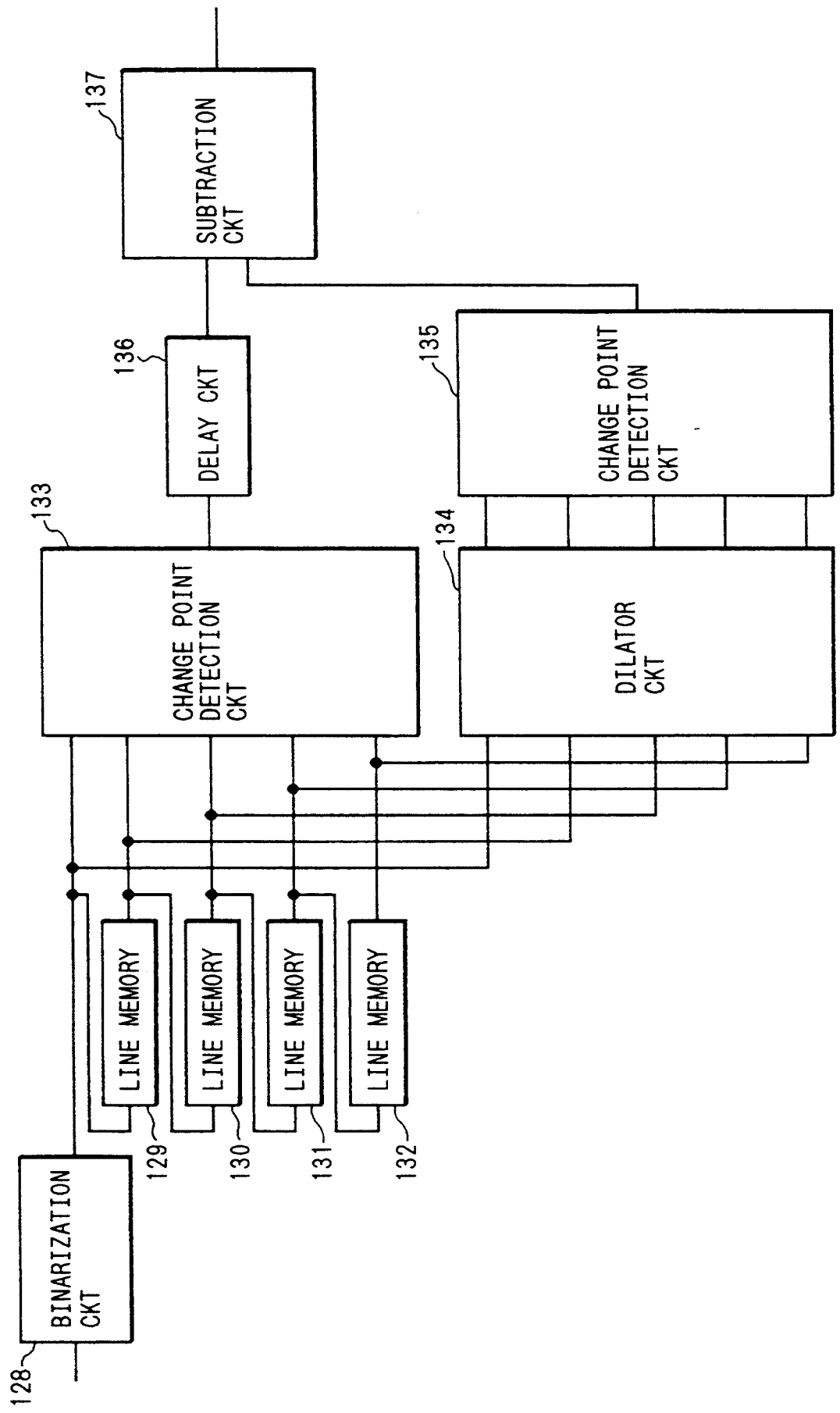

The screen detection circuit can be also constructed as shown in FIG. 1C. Reference numeral 128 denotes a binarization circuit to convert input multi-value image data into binary data; 129 to 132 indicate line memories; and 133 a change point detection circuit to detect the number of change points from 0 to 1 and from 1 to 0 with respect to the binary data in a pixel block of 5×5 in the case where the target pixel is the central pixel. The change point detection circuit 133 detects the number(s) of change points in either or both of the main scanning direction and the sub-scanning direction. Reference numeral 134 indicates a dilator circuit. With respect to each pixel in the pixel block of 5×5 pixels, if any one pixel of the value of "1" exists in nine pixels including eight peripheral pixels, the values of all of the nine pixels are set to 1, thereby dilating the binary image. Reference numeral 135 denotes a change point detection circuit to detect the number of change points with respect to the dilated binary image in a manner similar to the change point detection circuit 133; 136 a delay circuit to match the timings for outputs of the change point detection circuits 133 and 135; and 137 a subtraction circuit to calculate the difference between the outputs of the detection circuits 133 and 135.

In the case of the screen area, since the binary image changes at a relatively short period, if the image was dilated, the size of the reduction in the number of change points increases. On the contrary, in the case of the character and photographic areas, the size of the reduction in the number of the change points is relatively small.

It will be understood from the above description that in the screen area, both the edge amount and the count number of changed pixels are large and in the character area, the edge amount increases and the count number is small. On the other hand, in the photographic area, both of the edge amount and the count number are small or the edge amount is small and the count number is large.

That is, the following fuzzy rules are considered:
① If (the edge amount is large) and (the count value is large), then screen area;
② If (the edge amount is large) and (the count value is small), then character area
③ If (the edge amount is small) and (the count value is small), then photograph area; and
④ If (the edge amount is small) and (the count value is large), then photograph area.

Figure 3A:
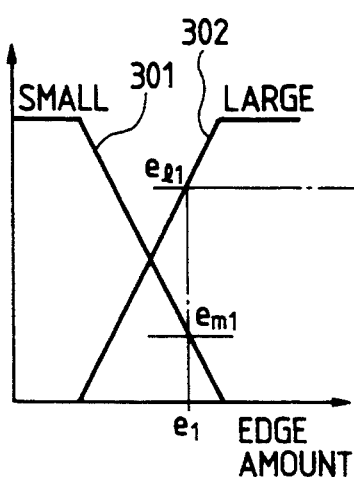
FIGS. 3A to 3J are diagrams showing examples of membership functions which are used in a judgment circuit.
Figure 3B:
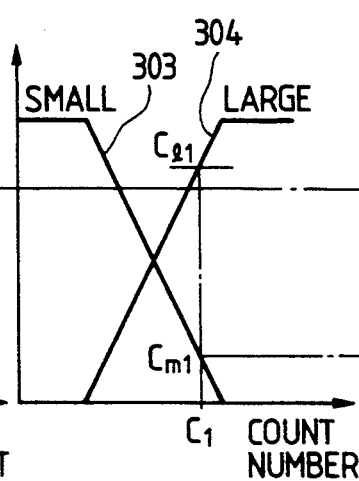
Figure 3C:
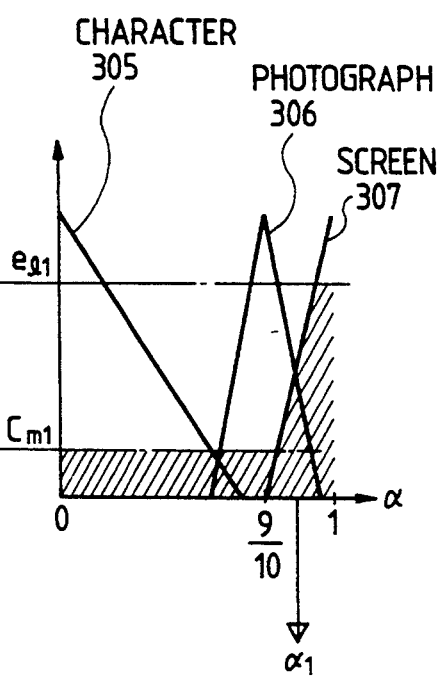

When the above relations are expressed by membership functions which are used in the fuzzy inference, they are as shown in FIGS. 3A to 3F. FIG. 3A shows the membership functions for the edge amount, in which reference numeral 301 indicates "a degree to which the edge amount is small" and 302 indicates "a degree to which the edge amount is large". FIG. 3B shows the membership functions for the count value, in which reference numeral 303 indicates "a degree to which the count value is small" and 304 indicates "a degree to which the count value is large". FIG. 3C shows the membership functions indicative of the conclusion sections, in which reference numeral 305 indicates "a degree to which the image corresponds to a character area", 306 indicates "a degree to which the image corresponds to a photographic area", and 307 indicates "a degree at which the image corresponds to a screen area".

The value of $\alpha$ is obtained by using the above rules regarding the edge amount and the count value. Now, assuming that the edge amount is set to $e_1$ and the count value is set to $c_1$, a conformity with the conclusion indicating that "the image corresponds to a screen area" is first obtained by using the rule ①. Since the screen area relates to the case where both an edge amount e and a count value c are large, an intersection $e_{l1}$ of $e_1$ and 302 and an intersection $c_{l1}$ of $c_1$ and 304 are obtained. $e_{l1}$ and $c_{l1}$ are compared and the conclusion section 307 is cut away by the smaller value $e_{l1}$. Thus, the inside hatched portion of 307 shows a screen likelihood.

In a manner similar to the above, a conformity with the conclusion indicating that "the image corresponds to a character area" is obtained by using the rule ②. Since the character area relates to the case where the edge amount e is large and the count value c is small, the intersection $e_{l1}$ of $e_1$ and 302 and an intersection $c_{m1}$ of $c_1$ and 303 are obtained. $e_{l1}$ and $c_{m1}$ are compared and the conclusion section 305 is cut away by the smaller value $c_{m1}$.

In a manner similar to the above, a photographic likelihood is obtained by using the rules ③ and ④ and their overlap portion is derived, so that the hatched region in FIG. 3C is obtained.

A barycenter of the hatched region is obtained and the position of the barycenter on an axis of abscissa is obtained. This position is set to a value $\alpha_1$ of $\alpha$ to be derived. In the case of this example, since both the values of $e_1$ and $c_1$ are relatively large, the resultant value of $\alpha_1$ is close to 1.

Figure 3D:
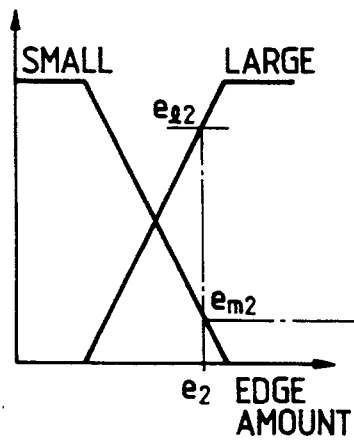
Figure 3E:
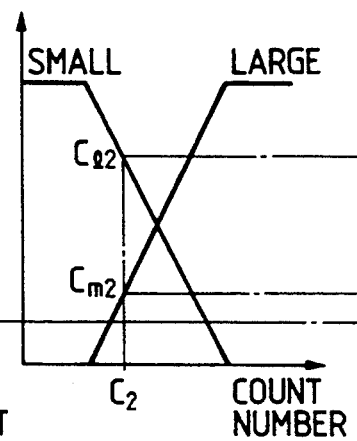
Figure 3F:
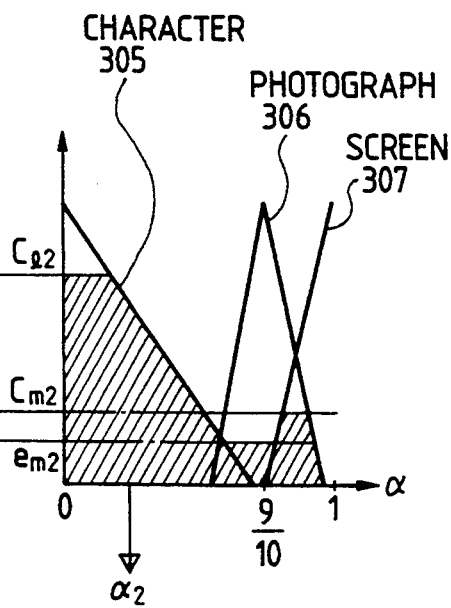

On the other hand, as shown in FIGS. 3D to 3F, assuming that the edge amount is set to $e_2$ and the count value is set to $c_2$, $\alpha_2$ is also similarly obtained. In this case, since $e_2$ is relatively large and $c_2$ is relatively small, the image is nearly a character area. Therefore, it will be understood that the value of $\alpha_2$ is near 0.

Figure 3G:
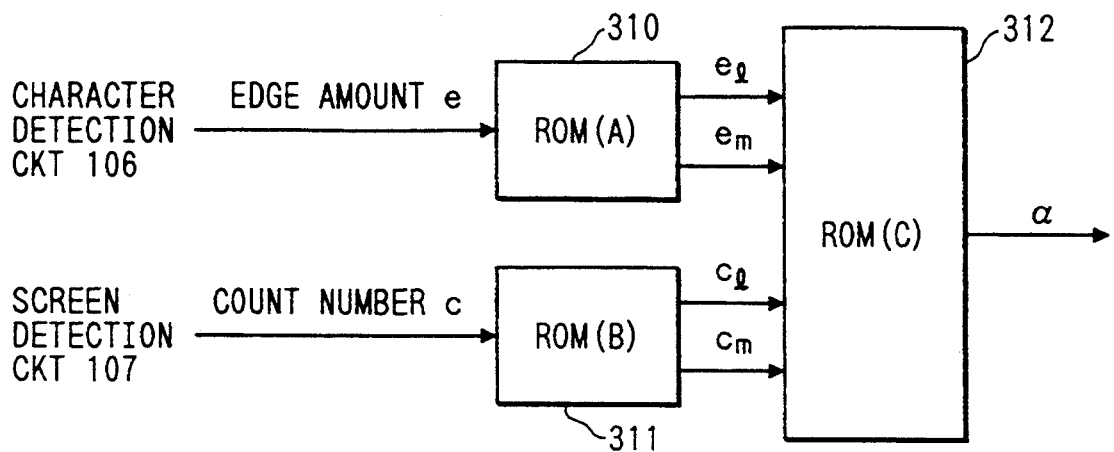

For the membership functions in FIGS. 3A to 3F, for instance, each of the functions 301 to 307 shown in FIGS. 3A to 3F is stored into ROM or RAM as a one-dimensional lookup table provided in the judgment circuit 108 and the calculation result α can be obtained from the output of each table. FIG. 3G shows a construction to realize such a method. Reference numerals 310, 311, and 312 denote a ROM(A), a ROM(B), and a ROM(C), respectively. The membership functions regarding the edge amount as one of the state amounts are stored in the ROM (A) 310. By inputting the edge amount e from the character detection circuit 106, conformities $e_m$ and $e_l$ for the membership functions 301 and 302 are output from the ROM 310. Similarly, the membership functions regarding the count value as one of the state amounts are stored in the ROM (B) 311. By inputting the count value c from the screen detection circuit 107, conformities $c_m$ and $c_l$ for the membership functions 303 and 304 are output from the ROM 311. The correspondences among the conformities $e_l$, $e_m$, $c_l$ and $C_m$ of the input signals e and c for the membership functions of the state amounts and α obtained by the above method are stored in the ROM (C) 312. That is, the ROM (C) 312 stores the results obtained by executing the comparing processes of the conformities $e_l$, $e_m$, $c_l$, and $c_m$ of the input signals e and c for the membership functions of the state amounts, the calculating processes of the conformities with the conclusion sections based on the foregoing rules, the calculating process of the barycenter, and the calculating process of the control amount α.

Figure 3H:
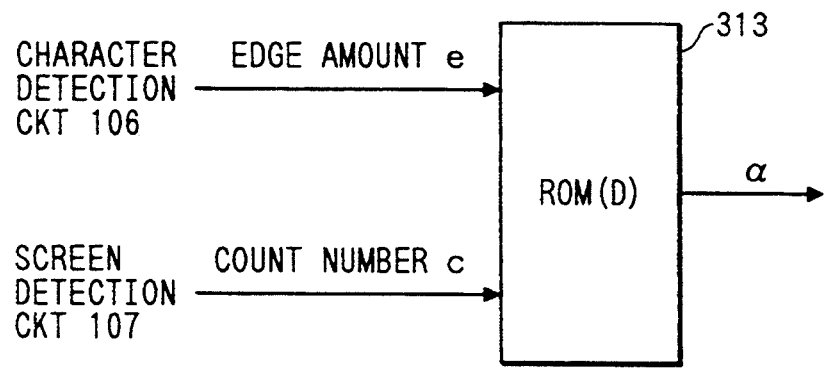

As shown in FIG. 3H, the judgment circuit 108 can be realized by a memory to store the values of α in a two-dimensional table format such as to output α for the input e and c. Such a memory can be constructed by a ROM as shown in FIG. 3H or RAM.

Figure 3I:
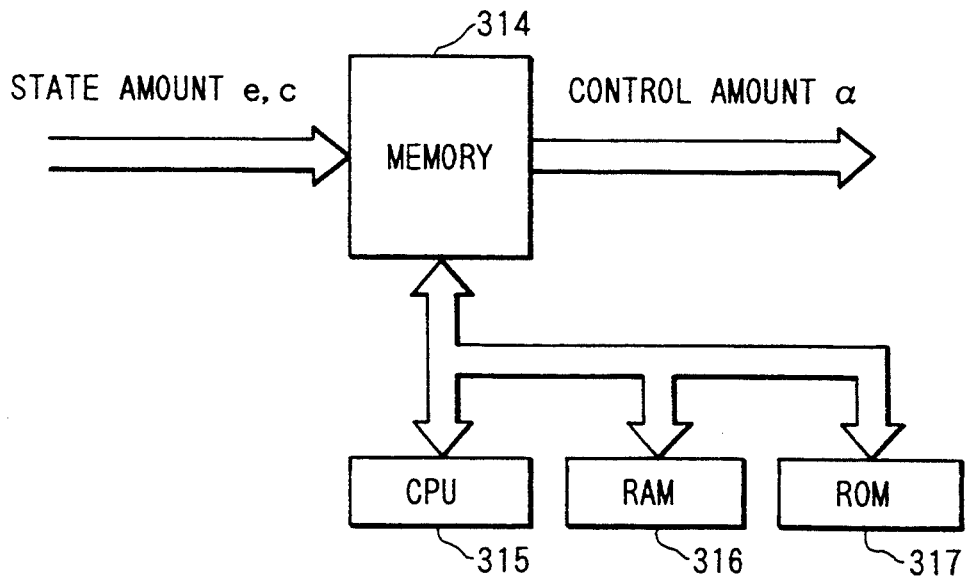

On the other hand, an shown in FIG. 3I, the judgment circuit 108 can be also constructed by a software using a CPU. In FIG. 3I, reference numeral 314 denotes a memory to store the input state amounts e and c and the control amount α as a result of the calculation; 315 a CPU to execute arithmetic operations, which will be explained hereinafter; 316 a RAM which is mainly used as a work area; and 3 17 a ROM to store operation programs, membership functions, fuzzy rules, and the like.

Figure 3J:
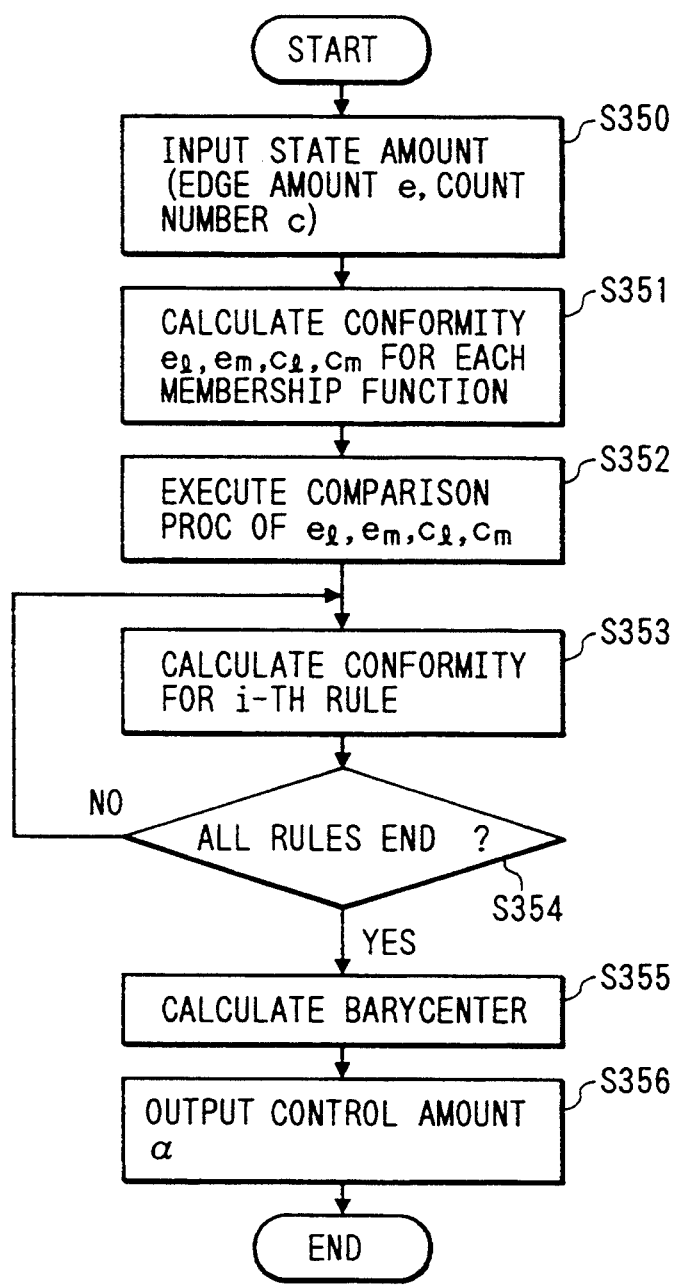

A processing flow will now be described with reference to a flowchart of FIG. 3J.

First, the edge amount e and the count value c as state amounts are input to the memory 314 (step S350). The above state amounts can be input to the memory by an amount of one frame or an amount of a few lines in accordance with the operating speed of the CPU 315. Then, the conformities $e_l$, $e_m$, $c_l$, and $c_m$ for each membership function of the edge amount e and count value c are calculated every pixel by using the membership functions stored in the ROM 317 (S351) and are temporarily stored into the RAM 316. The conformities $e_l$, $e_m$, $c_l$, and $c_m$ are compared by the CPU 315 (S352). The conformity for the ith rule among the rules stored in the ROM 317 is calculated (S353) and is stored into the RAM 316. The above processes are repeated with respect to all of the rules (S354). A barycenter is calculated from all of the conformities (S355). The control amount α is output (S356).

The operations of the fuzzy inference are completed as mentioned above.

According to the above embodiment of the invention, the optimum spatial filtering process can be executed for the character areas, photographic areas, and screen areas in the original image. On the other hand, since the mixing ratio of the edge emphasis and the smoothing can be continuously changed based on the relative strengths of those characteristics of the original, erroneous judgment in an area of vague decision is inconspicuous and the discontinuity which occurs due to the switching between processes can also be eliminated.

That is, in the case where the algorithm of the fuzzy inference was used for the separation of the image area and the processes based thereon, a conclusion is output by synthesizing the functions of a plurality of parameters. Therefore, for instance, even if one input parameter is wrong, the effect of the error on the conclusion is reduced. When reproducing an image such that the erroneous judgment is conspicous, an extremely typical effect of the prevention of erroneous judgment is obtained.

On the other hand, in the case of executing the fuzzy inference, it is easily possible to increase the number of input parameters which are necessary to obtain a certain conclusion and to synthesize the conclusions. The invention is effective in the portion of the image process which can be easily influenced by various conditions. That is, for instance, a conclusion can be more accurately obtained by using other parameters such as intra-block average density, continuity of image, and the like in addition to the edge amount and count value in the foregoing embodiment.

Figure 1D:
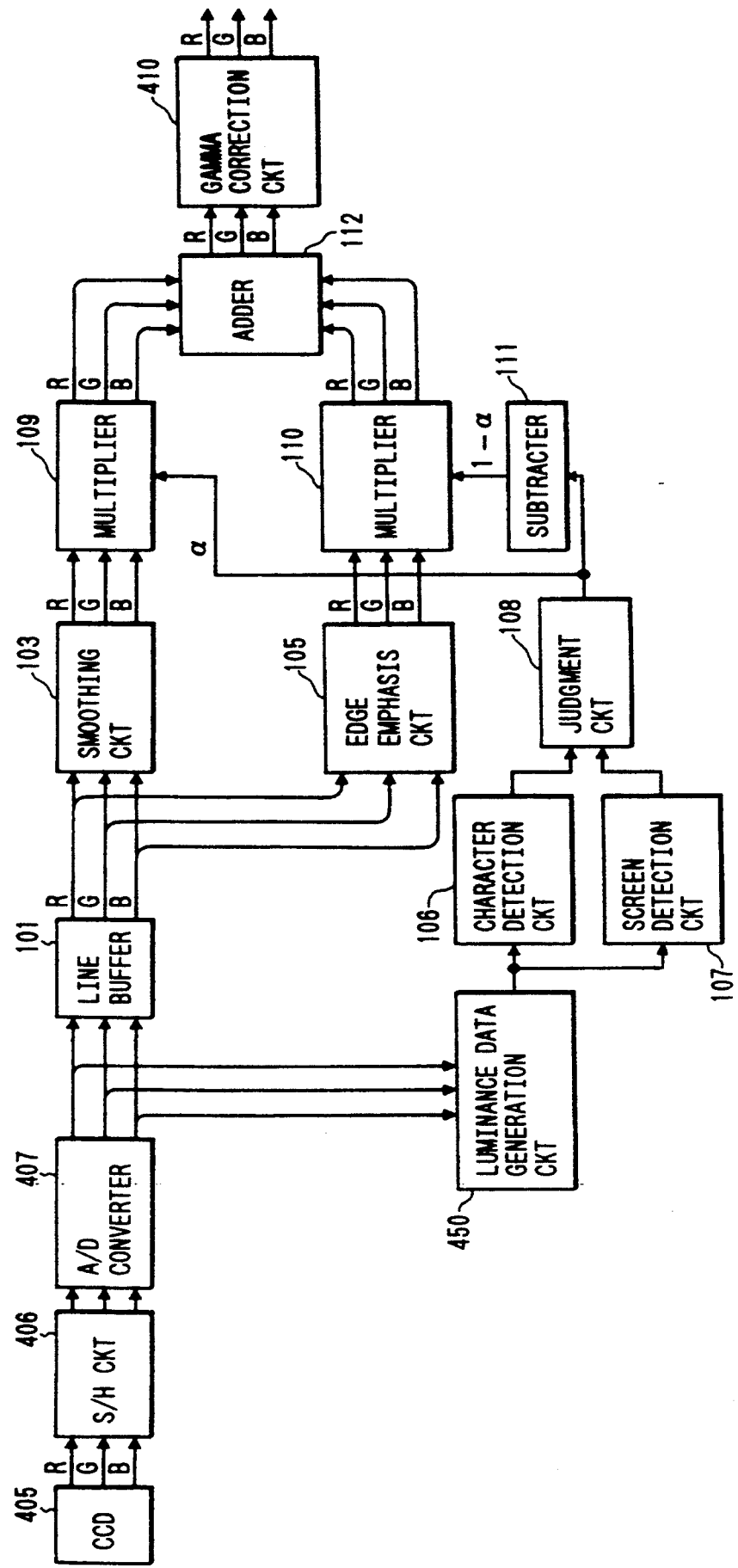

The invention can be also obviously applied to the processes of a color image as well as a black and white image. In this case, the apparatus can be constructed as shown in FIG. 1D. Although the operation of each section is substantially similar to that in FIG. 1A, in FIG. 1D, the processes are executed in parallel the read signals of R, G, and B color components.

On the other hand, since the luminance data is used for edge detection and screen detection, a luminance data generation circuit 450 executes the calculation of (0.3R+0.59G+0.11B) for input signals R, G, and B. The signal of (R+G+B)/3, or only the G signal, can be also used in place of the luminance data. On the other hand, if the parameters are properly set with respect to each of three primary colors of R, G, and B and a judgment circuit is provided for each of the color signals and a plurality of judgment results are used, the discriminating accuracy is further improved.

EMBODIMENT 2

As a second embodiment, there is considered a case of using filters of 5×5 as shown in FIGS. 5A and 5B as filters for the smoothing and the edge emphasis. Even in this case, in a manner similar to the above embodiment, the weighted mean of outputs of both of the filters is calculated by the equation (1) by setting the weighted mean ratio to α. As will be obvious from FIG. 5, the case of α=19/20 is equivalent to the filter of FIG. 5C. Therefore, membership functions of the conclusion section are as shown by reference numerals 601 to 603 in FIG. 6. Particularly, the peak of the function 602 corresponding to a photograph appears when α=19/20 instead of α=9/10 in FIG. 3.

As mentioned above, according to the present embodiment, the effects of the smoothing and the edge emphasis can be enhanced by enlarging the matrix size of the filter.

As described above, according to the invention, the proper image process can be executed in accordance with the feature of the input image and the picture quality of output image is remarkably improved.

EMBODIMENT 3

According to the third embodiment of the invention, by providing a plurality of linear masking circuits and a color judgment circuit, a plurality of masking correction outputs are synthesized in accordance with the color of an image original. The color judgment circuit can smoothly synthesize them by using membership functions.

Figure 8:
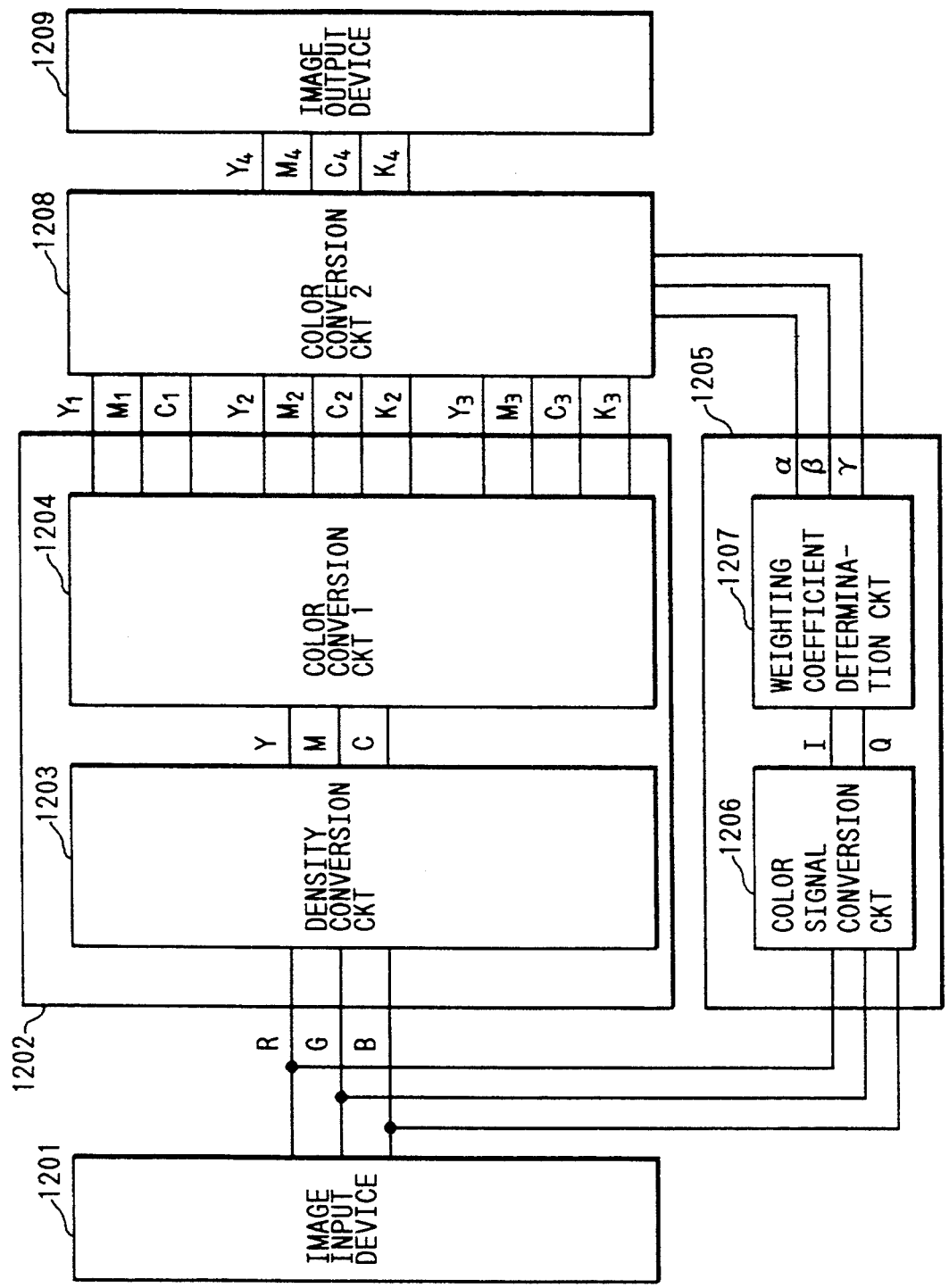
FIG. 8 is a whole block diagram of the first embodiment of the invention.

The third embodiment of the invention will now be described hereinbelow with reference to the drawings. FIG. 8 is a block diagram in which the constructions of the invention are combined for every process. In the diagram, reference numeral 1201 denotes an image input device comprising a CCD color image sensor, a sample and hold circuit, an A/D converter, and the like. The image input device 1201 outputs digital color separation signals Red, Green, and Blue of an image original to be copied. Reference numeral 1202 in the diagram indicates a color reproducing system comprising a density conversion circuit 1203 and a color conversion circuit 1204 to execute the conversion of R, G, B→Y, M, and C. The R, G, and B color separation signals which were output from the image input device 1201 are input to the density conversion circuit 1203 and are converted from luminance signals to density signals in accordance with the following equation (4) (thus, the C, M, and Y signals are generated from the R, G, and B signals, respectively):

$$\begin{pmatrix} C \\ M \\ Y \end{pmatrix} = -\log_{10}(R, G, B) \quad (4)$$

Then, the density signals C, M, and Y are input to the color conversion circuit 1 (1204) in the diagram, by which a black signal K is produced from the minimum value MIN(Y, M, C) of the Y, M, and C signals. The masking process is executed to correct the output characteristics (printing characteristics such as reduction of saturation or the like upon color mixing of the color inks in the case of, for instance, the ink jet system) of an image output device 1209.

Figure 9A:
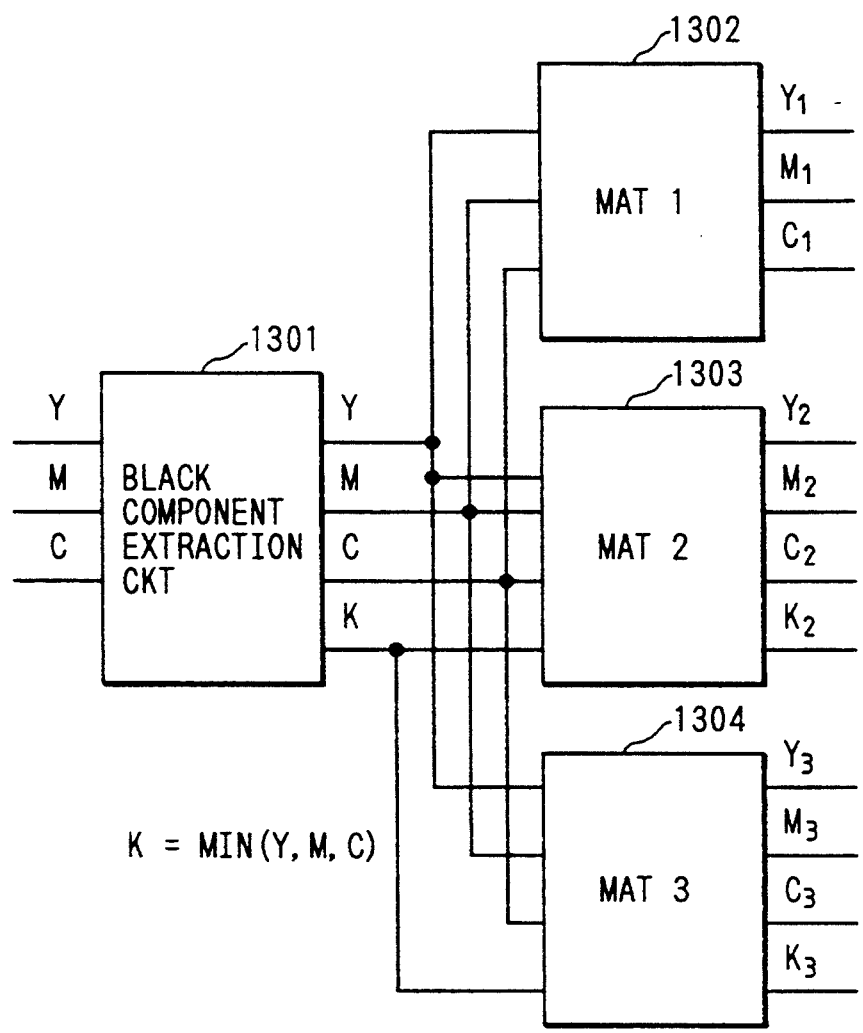
FIGS. 9A to 9C are block diagrams and the like of a color conversion circuit 1.

The color conversion circuit 1 of the invention will now be described in detail with reference to FIG. 9A. As also already described in the conventional example, the Y, M, C, and K signals including the black signal K which was reproduced from the minimum value among the Y, M, and C signals by the black component extraction circuit 1301 are input to a masking circuit 303 including high-order terms such as $Y^2$ and $M^2$ terms or means of a like. The color conversion is executed by the polynomial including the square term and product term as shown by, for instance, the equation (1) in the conventional example. As mentioned above, by including the high-order terms, masking coefficients indicative of the good color reproducibility are set with respect to achromatic color.

On the other hand, the output signals Y, M, C, and K of the black component extraction circuit 1301 are similarly input to a masking circuit 1304 and the masking operations as shown by the following equations (5) are executed:

$$\left. \begin{array}{l} \begin{pmatrix} Y_3 \\ M_3 \\ C_3 \end{pmatrix} = \begin{pmatrix} b_{11} & b_{12} & b_{13} \\ b_{21} & b_{22} & b_{23} \\ b_{31} & b_{32} & b_{22} \end{pmatrix} \begin{pmatrix} Y \\ M \\ C \end{pmatrix} \\ K_3 = b_{44} K \end{array} \right\} \quad (5)$$

Masking coefficients $b_{ij}$ ($i \leq ij \leq 3$) and $b_{44}$ are determined by a method whereby values such as to optimize the color reproducibility for an achromatic reading original are calculated by a method of least square and an UCR (100% UCR) process near the full black is also performed, thereby determining the masking coefficients. That is, the cofficients such as $b_{44} \sim 1$ $b_{11} \sim b_{22} \sim b_{33} \sim 0$ are set.

On the other hand, the output signals Y, M, and C of the black component extraction circuit 1301 are input to a masking circuit 1302 and the masking operation shown by the equation following (6) is executed:

$$\begin{pmatrix} Y_1 \\ M_1 \\ C_1 \end{pmatrix} = \begin{pmatrix} d_{11} & d_{12} & d_{13} \\ d_{21} & d_{22} & d_{23} \\ d_{31} & d_{32} & d_{22} \end{pmatrix} \begin{pmatrix} Y \\ M \\ C \end{pmatrix} \quad (6)$$

Masking coefficients $d_{ij}$ ($1 \leq ij \leq 3$) are set by the optimization of color reproducibility for a read original containing flesh tints. That is, values such as to optimize the reproducibility for flesh tints are previously calculated as $d_{ij}$. On the other hand, the flesh tints are reproduced by three colors of Y, M, and C without providing the term of K (black) in the output. This is because in the case of flesh tints, if black toner is mixed in inaccurate muddiness of color occurs.

As mentioned above, the color conversion circuit 1204 comprises the three kinds of masking circuits 1302, 1303, and 1304 whose masking coefficients have peculiar meanings, respectively. In the masking circuit 1302, the masking coefficients such as to become uniform and minimum over the whole color space range are set and signals $Y_2$, $M_2$, $C_2$, and $K_2$ are output. In the masking circuit 1303, masking coefficients which exhibit extremely good color reproducibility with respect to achromatic color are set and signals $Y_3$, $M_3$, $C_3$, and $K_3$ are output. In the masking circuit 1302, masking coefficients which exhibit extremely good color reproducibility with regard to flesh tints are set and signals $Y_1$, $M_1$, and $C_1$ are output.

The output signals $(Y_1, M_1, C_1)$, $(Y_2, M_2, C_2, K_2)$, and $(Y_3, M_3, C_3, K_3)$ from the color conversion circuit 1 (1204) are then input to a color conversion circuit 2 (1208). The conversion of the following equation (7) is executed by using weighting coefficients $\alpha$, $\beta$, and $\gamma$, which will be explained hereinbelow.

$$\begin{pmatrix} Y_4 \\ M_4 \\ C_4 \\ K_4 \end{pmatrix} = \alpha \begin{pmatrix} Y_1 \\ M_1 \\ C_1 \end{pmatrix} + \beta \begin{pmatrix} Y_2 \\ M_2 \\ C_2 \\ K_2 \end{pmatrix} + \gamma \begin{pmatrix} Y_3 \\ M_3 \\ C_3 \\ K_3 \end{pmatrix} \quad (7)$$

(where $\alpha+\beta+\gamma=1$). Output signals Y4, M4, C4, and K4 are sent to the image output device 1209 and are printed and recorded.

A method of deciding the weighting coefficients $\alpha$, $\beta$, and $\gamma$ will now be described. The color separation signals of R, G, and B from the image input device 1201 are input to the color reproducing system 1202 and to a weighting coefficient setting system 1205. The weighting coefficient setting system 1205 mainly comprises two circuits of a color signal conversion circuit 1206 and a weighting coefficient determination circuit 1207. The color signal conversion circuit 1206 converts the R, G, and B signals into Y, I, and Q signals of the NTSC system. Practically speaking, the linear conversion is executed by the following equation (8) in a manner such that the R, G, and B signals of the CCD outputs are equalized to signal outputs of R', G', and B' based on the NTSC system:

$$\begin{pmatrix} R' \\ G' \\ B' \end{pmatrix} = \begin{pmatrix} e_{11} & e_{12} & e_{13} \\ e_{21} & e_{22} & e_{23} \\ e_{31} & e_{32} & e_{33} \end{pmatrix} \begin{pmatrix} R \\ G \\ B \end{pmatrix} \quad (8)$$

As is well known, since the conversion from the R, G, and B signals by the NTSC system into Y, I, and Q signals is expressed by the following equation (9).

$$\begin{pmatrix} Y \\ I \\ Q \end{pmatrix} = \begin{pmatrix} 0.3 & 0.59 & 0.11 \\ 0.6 & -0.28 & -0.32 \\ 0.21 & -0.52 & 0.31 \end{pmatrix} \begin{pmatrix} R' \\ G' \\ B' \end{pmatrix} \quad (9)$$

the conversion from the R, G, and B signals of the CCD outputs into the Y, I, and Q signals is as shown by the following equation (10) from the equations (8) and (9). The conversion of the equation (10) is performed by the color signal conversion circuit 1206:

$$\begin{pmatrix} Y \\ I \\ Q \end{pmatrix} = \begin{pmatrix} 0.3e_{13} + 0.59e_{21} + 0.11e_{31}, \\ 0.6e_{13} - 0.28e_{21} - 0.32e_{31}, \\ 0.21e_{13} - 0.52e_{23} + 0.31e_{31}, \end{pmatrix} \quad (10)$$

$$0.3e_{12} + 0.59e_{22} + 0.11e_{32},$$
$$0.6e_{12} - 0.28e_{22} - 0.32e_{32},$$
$$0.21e_{12} - 0.52e_{22} + 0.31e_{32},$$

$$\begin{pmatrix} 0.3e_{13} + 0.59e_{23} + 0.11e_{33} \\ 0.6e_{13} - 0.28e_{23} - 0.32e_{33} \\ 0.21e_{13} - 0.52e_{23} - 0.31e_{33} \end{pmatrix} \begin{pmatrix} R \\ G \\ B \end{pmatrix}$$

Further, the I and Q signals are input to the weighting coefficient determination circuit 1207, by which the color tone is discriminated and the weighting coefficients $\alpha$, $\beta$, and $\gamma$ are output.

That is, when the color of reading image is achromatic, $\alpha \approx 1$ in the equation (7) is set and the output values of the masking process which were optimized by achromatic color are transferred to the recording device. On the other hand, if the read image contains flesh tints, $\gamma \approx 1$ in the equation (7) is set and the output values of the masking process which were optimized by flesh tints are transferred to the recording device.

Figure 10:
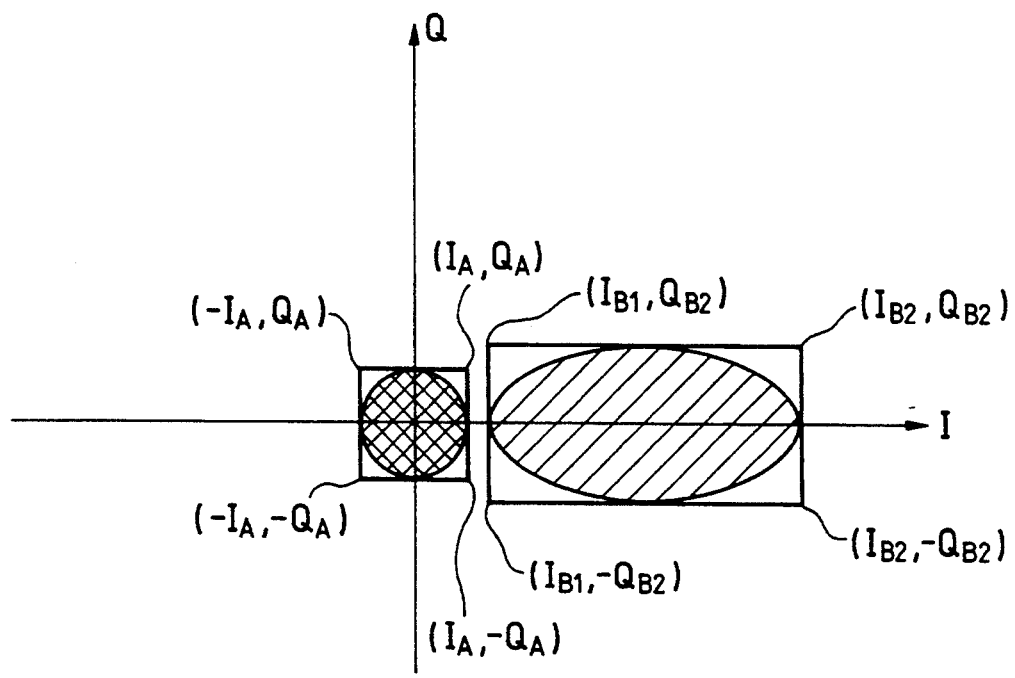
FIG. 10 is a diagram showing a color distribution in an I-Q area.

A method of deciding the weighting coefficients $\alpha$, $\beta$, and $\gamma$ from the I and Q signals will now be described. FIG. 10 shows a distribution diagram (area A) of the I and Q signals by the achromatic image and a distribution diagram (area B) of the I and Q signals by the flesh tints image.

It is now assumed that the levels of "blackness" are not equal in any of the I and Q coordinates in the area A in the case of black and the degree of "blackness" which is recognized by a measuring person differs.

In other words, everyone recognizes "black" at an origin $(I=Q=\phi)$ of the I and Q axes as "black or gray or achromatic color". However, as the position approaches the boundary line in the area A, there is a possibility that the color is regarded to be "almost black", "slightly black", or the like. Further, on the boundary line, there is also a possibility that the color is recognized to be "red" such as "black-like red" or the like.

Therefore, in order to quantize the "black-like" color, an aberration amount $\Delta$ of the impression from true black is expressed by the axis of abscissa and numerical values of 0 to 1 are set on the axis of ordinate and membership functions as shown in FIG. 7A which are expressed by degrees (grades) are made.

Practically speaking, the values of I and Q at the boundary line in the area A in FIG. 10 are set to the maximum value of the aberration amount $\Delta$. The values of I and Q at the center of the area A are set $\Delta=0$ and the value of $\Delta$ is standardized by 0 to 1 and set to the axis of abscissa.

Practically speaking, now assuming that the I and Q signals of a certain color C are set to values of $I_i$ and $Q_i$.

$$\left. \begin{array}{l} \Delta I = \dfrac{I_i - I_c}{I_A - I_c} \\ \\ \Delta Q = \dfrac{Q_i - Q_c}{Q_A - Q_c} \end{array} \right\} \quad (11)$$

$I_A$, $Q_A$: Values of I and Q on the boundary line
$I_C$, $Q_C$: Values of I and Q at the center of the area
With respect to the achromatic color, since the center is set such that $I_C=Q_C=0$, the equations (11) can be rewritten as follows.

$$\Delta I = \left| \dfrac{I_i}{I_A} \right| \quad \Delta Q = \left| \dfrac{Q_i}{Q_A} \right|, \quad (11)$$

For instance, as shown in FIG. 7A, five membership functions are set by giving the following label names:
(1101) "(the aberration amount of the color is very small=VS)"
(1102) "(small=S)"
(1103) "(medium=M)"
I(1104) "(large=L)"
(1105) "(very large=VL)"

For instance, the function of "the aberration amount is very small" is a function such that the degree decreases as the value of $\Delta$ increases in a manner such that when $\Delta=0$, the degree=1 (that is, everyone agrees that the color is black) and that when $\Delta=0.5$, the degree=0.

The function of "medium" is a function such that when $\Delta=0.5$, the degree=1. Now, assuming that the value of $\Delta$ of a certain color C is set such that $\Delta I=0.44$ and ΔQ=0.2 as shown in FIG. 7A, the values of the respective functions are set as follows (refer to FIGS. 11A to 11E).

| | | | |
|---|---|---|---|
| $VS(\Delta I)$ | = 0.125 | $VS(\Delta Q)$ | = 0.6 |
| $S(\Delta I)$ | = 0.625 | $S(\Delta Q)$ | = 0.9 |
| $M(\Delta I)$ | = 0.9 | $M(\Delta Q)$ | = 0.4 |
| $L(\Delta I)$ | = 0.375 | $L(\Delta Q)$ | = 0.0 |
| $VL(\Delta I)$ | = 0.0 | $VL(\Delta Q)$ | = 0.0 |

Those function values are now applied to the rule block (FIG. 7B) which specifies the fuzzy rule. The rule block is written in a format of "IF ~ THEN - - - ". It is now assumed that ~ is called a condition part and - - - is called a consequence part.

Now, when considering the rule ①, there are two clauses such as I=VS (ΔI) and Q=VS (ΔQ) and their degrees are set such that VS (ΔI)=0.125 and VS (ΔQ)=0.6. Therefore, the degree of the condition part has the minimum value (=0.125) of each clause. Further, the degree of the consequence part is also set to 0.125.

The consequence parts have membership functions as shown in FIG. 7C and function names of VS to VL are given to them.

Figure 12:
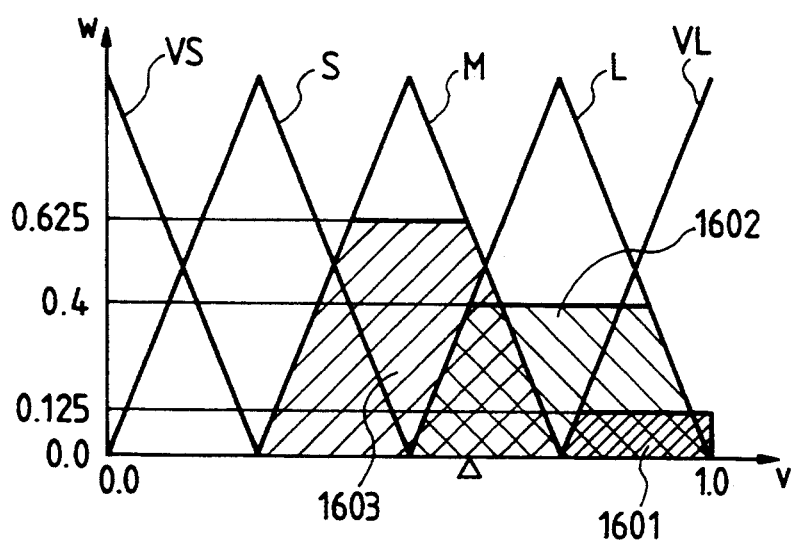
FIGS. 11A to 11E and 12 are diagrams for explaining examples of the fuzzy inference.
Figure 11A:
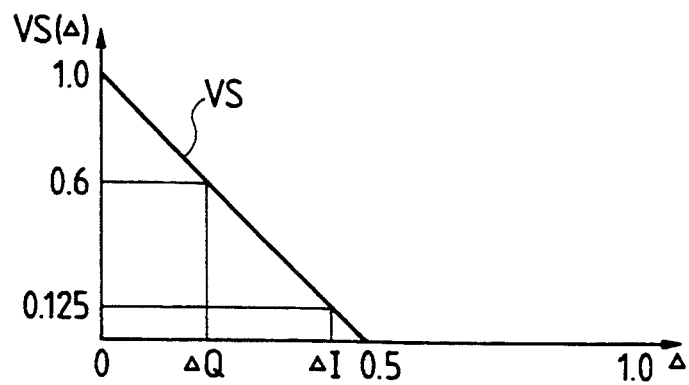
Figure 11B:
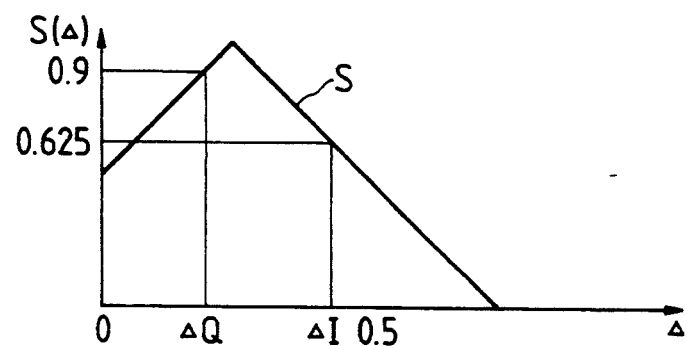
Figure 11C:
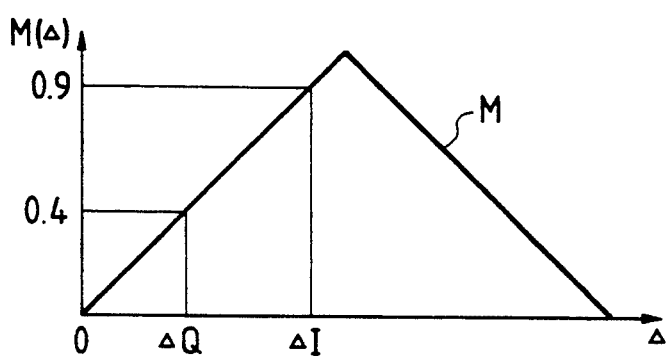
Figure 11D:
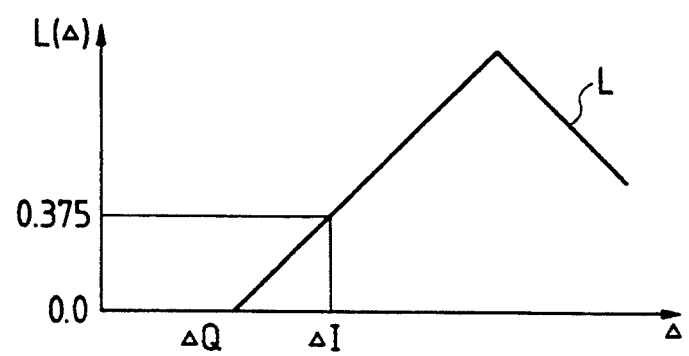
Figure 11E:
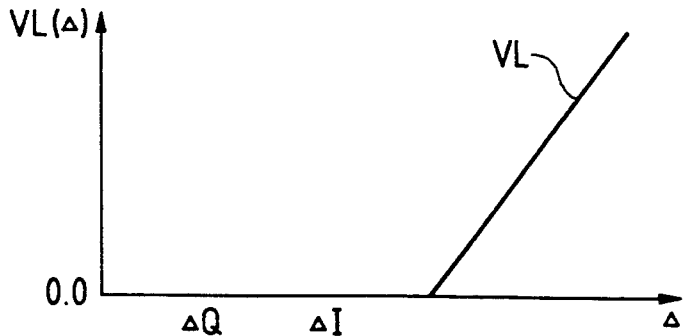

The function of the consequence part of the rule ① is obtained by cutting away the membership function VL at VL=0.125 and the conclusion for the rule ① is set to a hatched portion 1601 in FIG. 12. Similarly, the consequence parts of the rules ② to ⑤ are shown below:

① $\omega=0.125$
② $\omega=0.625$
③ $\omega=0.4$
④ $\omega=0.0$
⑤ $\omega=0.0$

Figure 6:
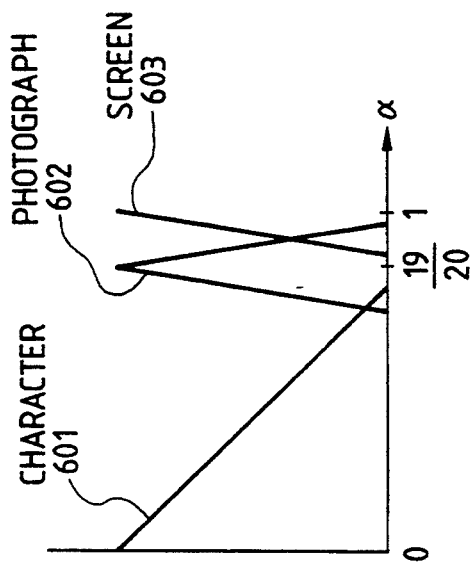
FIG. 6 is a diagram showing examples of membership functions corresponding to those in FIG. 5.

A barycenter x of the area of a black bold frame in FIG. 6 which surrounds the portion shown is then obtained:

$$x = \frac{\int_0^1 \omega \cdot v \, d_v}{\int_0^1 \omega \, d_v} \quad (12)$$

The value of x is set to a weighting coefficient γ for the achromatic color.

In FIG. 12, x=γ=0.6. Similarly, the weighting coefficient with respect to flesh tints is calculated from an area B and is set to α.

From the above α and γ, $$\left. \begin{array}{l} \beta = 1 - \alpha - \gamma \quad (\alpha + \gamma \leq 1) \\ \alpha' = \frac{\alpha}{\alpha + \gamma} \quad \beta' = 0 \quad \gamma' = \frac{\gamma}{\alpha + \gamma} \quad (\alpha + \gamma \geq 1) \end{array} \right\} \quad (13)$$

α, β, and γ or α', β', and γ' are obtained. Those weighting coefficients are transferred to the color conversion circuit 1208 in FIG. 8 and are used as an input signal to the image output device 1209 by the equation (7).

Figure 9B:
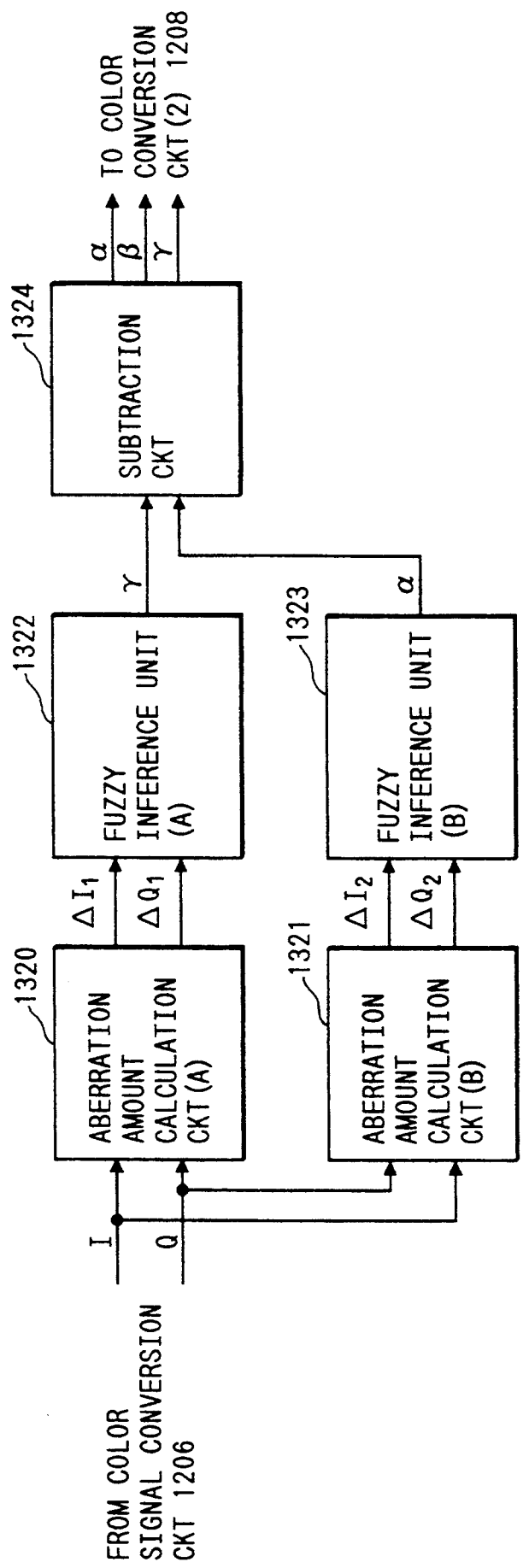

FIG. 9B shows a construction of the weighting coefficient determination circuit 1207. Reference numerals 1320 and 1321 denote aberration amount calculation circuits (A) and (B) for outputting aberration amounts $\Delta I_1$ and $\Delta Q_1$ from reference black and aberration amounts $\Delta I_2$ and $\Delta Q_2$ from reference flesh tint for the input signals I and Q, respectively. Reference numerals 1322 and 1323 denote fuzzy inference units for executing the fuzzy inference with respect to "black likelihood" and "flesh tint likelihood", respectively. The fuzzy inference units output γ indicative of the black likelihood and α indicative of the flesh tint likelihood. Reference numeral 1324 denotes a subtraction circuit for executing the calculations of the equations (13) and for sending α, β, and γ to the color conversion circuit 2.

Figure 9C:
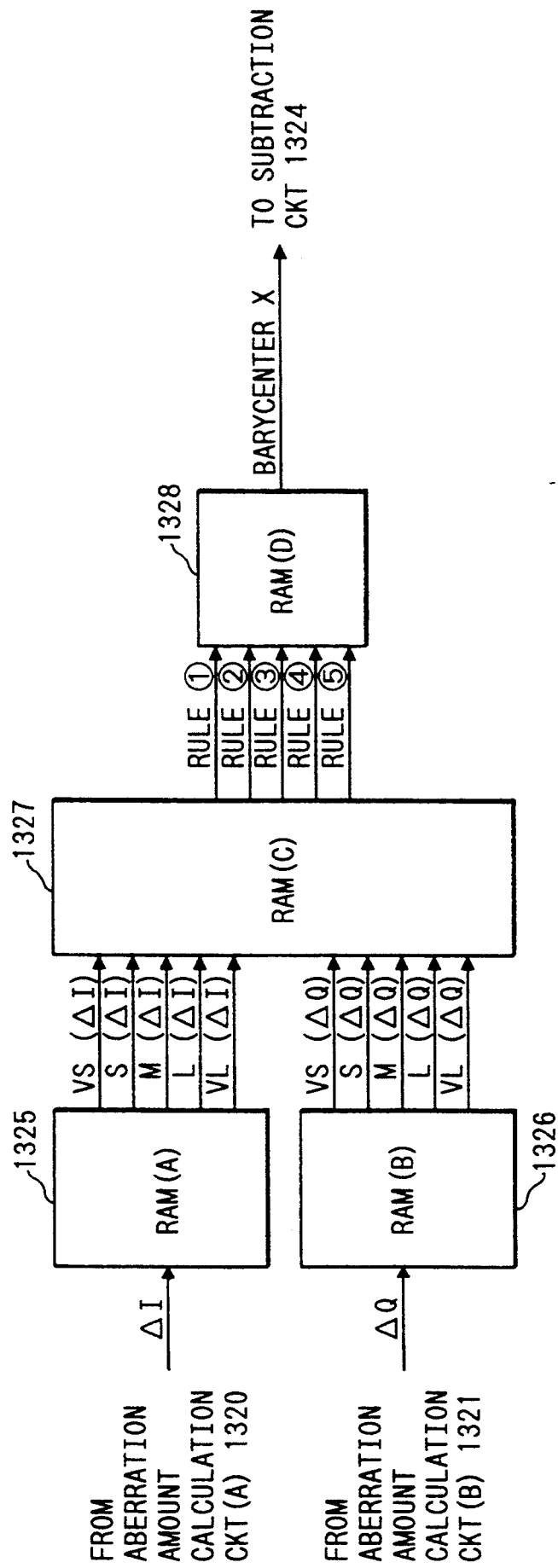

FIG. 9C shows constructions of the fuzzy inference units 1322 and 1323. Reference numerals 1325 to 1328 denote RAMs. The RAM (A) 1325 and the RAM (B) 1326 output the degrees which belong to the membership functions VS, S, M, L, and VL with respect to ΔI and ΔQ, respectively. The RAM (C) 1327 outputs the degrees which conform with the rules ① to ⑤. The RAM (D) 1328 outputs the barycenter x on the basis of the equation (10). The barycenter x is used as a result of the fuzzy inference.

The construction of the fuzzy inference unit can be modified. In a manner similar to FIG. 3H, the barycenter x can be also directly output by inputting the state amounts ΔI and ΔQ. On the other hand, in a manner similar to FIG. 3I, the software processes can be also executed by using the CPU.

As an image output device 1209, it is possible to use various kinds of printers for outputting a color image such as color laser beam printer, color ink jet printer, color thermal copy transfer printer, and the like.

Each of the color conversion circuits 1 and 2, color signal conversion circuit 1206, and weighting coefficient determination circuit 1207 can be constructed by a ROM or RAM. It is sufficient to make the contents of the table correspond so as to output the output signals such that the processing results as mentioned above can be obtained for the input signals. On the other hand, instead of using any ROM and RAM, it is also possible to use a circuit such as to actually execute arithmetic operations any time in a manner similar to the case described in the embodiment 1.

As described above, according to the present embodiment, by continuously switching the color correcting processes by the membership functions in consideration of the vagueness of the image reading signal, there is obtained an extremely high effect such that the color reproducibility of the image can be improved without causing any connecting portion (e.g., pseudo-contour) upon switching between the processes.

Particularly, according to embodiment, the color tone which has conventionally been dominated by the sense of human beings, for instance, the flesh tint likelihood or achromatic color likelihood, are expressed as membership functions and the control to be executed in accordance with the "likelihood" is determined as a "rule". Therefore, the delicate color tone control which has conventionally been difficult to automate can be easily executed.

Moreover, according to the invention, since the fuzzy inference is used to determine the output color, it is possible to easily cope with an increase in number of kinds of "likelihood" colors. That is, the number of functions to be used as parameters can be easily increased. The consequence for complicated conditions can be easily appreciated.

On the other hand, since the weighting coefficients $\alpha$, $\beta$, and $\gamma$ can be continuously changed, a smooth image can be obtained without causing a sudden change in the change portion of the color tone.

Even if an error exists in a part of the input parameters to be used as a condition part of the fuzzy inference, since the inference is performed by using a plurality of conditions, the probability of erroneous operation decreases extremely.

The method of deciding the membership functions, the kinds of variables, the contents of rules, the number of rules, and the like are not limited to those in the foregoing embodiments. The algorithm of the fuzzy inference is not limited to the method of calculating the barycenter but can be also modified to a method such that an incenter or a circumcenter is calculated or the like. Although the last preferred embodiment has been described with respect to color masking circuits, other correction circuits to correct the color tone, for instance, a gamma correction circuit, a color balance circuit, and the like can be also used. On the other hand, the input color component signals are also not limited to R, G, and B. Y, I, and Q signals, Y, M, and C signals, and the like can be also used. Similarly, the output signals are also not limited to the Y, M, and C signals for printing but the NTSC signals of the video signal can be also used. On the other hand, the detecting means can also detect the color in the R—G—B space instead of the I—Q space.

EMBODIMENT 4

In embodiment 3, two kinds of dedicated masking circuits for reproduction of black and for reproduction of flesh tints have been provided. However, in FIG. 9, by further increasing the dedicated masking circuits for reproduction of red and blue, for instance, the color signal conversion circuit 1206 and weighting coefficient determination circuit 1207 properly decide $I_A$, $I_C$, $Q_A$, and $Q_C$ in the equations (11) for standardization as they are, thereby further raising the reproducibility with respect to a target color and enabling the red likelihood color, blue likelihood color, and the like to be preferably reproduced.

EMBODIMENT 5

In embodiment 3, the R, G, and B signals have been converted into the Y, I, and Q signals of the NTSC system and input to the weighting coefficient determination circuit. However, in place of the Y, I, and Q signals, signal ratios G/R and B/R of the R, G, and B signals can be also used. At this time, for example, the center of black is set to G/R=B/R=1.

The equations (11') are expressed as follows:

$$\Delta G/R = \frac{(G/R)_i - 1}{(G/R)_A - 1}, \quad \Delta B/R = \frac{(B/R)_i - 1}{(B/R)_A - 1}$$

As described above, according to the invention, the color image processes of an extremely good color reproducibility can be executed.

The present invention is not limited to the foregoing embodiments but many modifications and variations are possible within the spirit and scope of the appended claims of the invention.

We claim:
1. An image processing apparatus comprising:
   a) input means for inputting an image signal;
   b) processing means for processing the image signal which was input by said input means and for outputting an image processed signal;
   c) first extracting means for extracting a first parameter relating to a first kind of characteristic of the image signal;
   d) second extracting means for extracting a second parameter relating to a second kind of characteristic of the input image signal;
   e) memory means for storing membership functions relating to the first and second parameters;
   f) rule storage means for storing a plurality of rules representing relations between the first and second parameters and a controlling parameter for determining a processing condition for use by said processing means; and
   g) inference means for inferring the controlling parameter by using the membership functions stored in said memory means and the plurality of rules stored in said rule storage means,
   wherein the controlling parameter is a multi-value datum.

2. An apparatus according to claim 1, wherein the first and second characteristics of the image signal include image types which are expressed by the image signal.

3. An apparatus according to claim 2, wherein the image types include a character image, a screen image, and a photograph image.

4. An apparatus according to claim 3, wherein said inference means infers the processing condition to be used by said processing means in accordance with any one of (a) a character image likelihood, which is a probability that the image signal represents a character image, (b) a screen image likelihood, which is a probability that the image signal represents a screen image, and (c) a photograph image likelihood, which is a probability that the image signal represents a photograph image, of the image signal.

5. An apparatus according to claim 4, wherein said processing means includes correcting means for correcting spatial frequency characteristics of the image signal and said interference means infers the correcting condition of said correcting means.

6. An apparatus according to claim 1, wherein the first and second characteristics of the image signal include color tones of images which are expressed by the image signal.

7. An apparatus according to claim 6, wherein said inference means infers the processing condition to be used by said processing means in accordance with either one of (a) a flesh tint likelihood, which is a probability that the image signal represents a flesh tint, and (b) an achromatic color likelihood, which is a probability that the image signal represents an achromatic color.

8. An apparatus according to claim 7, wherein said processing means includes color correcting means for executing a color correction of the image signal and said inference means infers the correcting condition of said color correcting means.

9. An image processing apparatus comprising:
   a) processing means for processing a digital image signal and for outputting a digital image reproduction signal;
   b) extracting means for extracting a plurality of characteristic amounts with respect to the digital image signal;

c) memory means for storing membership functions relating to the plurality of kinds of characteristic amount;

d) rule storage means for storing a plurality of rules with respect to relations between the plurality of characteristic amounts and processing conditions of the digital image signal by said processing means; and e) inference means for synthesizing the plurality of rules stored in said memory means with respect to each of the digital image signals and for determining the processing conditions, wherein the processing conditions determined by said inference means are expressed by respective multi-value data.

10. An apparatus according to claim 9, wherein the characteristic amounts include an edge amount per unit area and the number of change points of a binary image signal.

11. An apparatus according to claim 10, wherein said processing means includes correcting means for correcting spatial frequency characteristics of the digital image signal and said inference means infers the correcting condition of said correcting means.

12. An apparatus according to claim 9, wherein the characteristic amounts include a degree of similarity to an achromatic color and a degree of similarity to a flesh tint color.

13. An apparatus according to claim 12, wherein said processing means includes correcting means for executing a color correction of the digital image signal and said inference means controls the correcting condition of said correcting means.

14. An apparatus according to claim 9, wherein said memory means is constructed by a RAM or a ROM.

15. An image processing apparatus comprising:
a) input means for inputting image data representing an image;
b) extracting means for extracting a plurality of characteristic amounts of the image;
c) correcting means for correcting spatial frequency characteristics of the image data in accordance with said plurality of characteristic amounts of the image which were extracted by said extracting means; and
d) inference means for inferring, by using plural rules, the correction characteristics defined by a multi-volume datum to be changed over a continuous range by said correcting means in accordance with said plurality of characteristic amounts of the image.

16. An apparatus according to claim 15, wherein the characteristic of the image relate to a character image, a screen image, and a photograph image and said correcting means executes an edge emphasis to the character image and a smoothing to the screen image.

17. An apparatus according to claim 15, wherein said correcting means is constructed by two kinds of spatial filter circuits of a same window size comprising an edge emphasis circuit to execute an edge emphasis of the image data and a smoothing circuit to execute a smoothing and is constructed by having coefficients such that a result which is obtained by adding both of said spatial filter circuits at a predetermined ratio is set to 0 for the pixels other than the central pixel.

18. An apparatus according to claim 17, wherein said correcting circuit has a circuit to calculate a weighted mean of outputs of said two kinds of spatial filter circuits, said control means further has an image tone discriminating circuit to discriminate that a target area of the input image relates to which one of a character, a photograph, and a screen, if the result of the discrimination of said discriminating circuit is near the character area, a ratio of the edge emphasis in the weighted mean is raised, if it is near the screen area, a ratio of the smoothing is raised, and if it is near the photograph area, a ratio is set so that filter coefficients of the pixels other than the central pixel are set to values near 0.

19. An apparatus according to claim 15, wherein said control means recognizes the plurality of characteristics of the image which were extracted by said extracting means as a plurality of functions which continuously change and can continuously change the correction characteristics by said correcting means on the basis of arithmetic operations using said functions.

20. An apparatus according to claim 19, wherein the arithmetic operations are executed in a ROM or a RAM.

21. An apparatus according to claim 19, wherein the plurality of characteristics are a degree of character image and a degree of screen image.

22. An image processing apparatus comprising:
a) input means for inputting a plurality of color component signals;
b) a plurality of correcting means for executing respectively in parallel color corrections of the color component signals which were input by said input means, each of said correcting means having a different respective correcting characteristic;
c) synthesizing means for synthesizing outputs of said plurality of correcting means at a predetermined ratio where said ratio is a multi-value datum; and
d) control means for enabling the ratio for synthesis by said synthesizing means to be changed over a continuous range.

23. An apparatus according to claim 22, further having means for detecting color tones of the input color component signals, and wherein said control means determines the ratio in accordance with the result of the detection by said detecting means.

24. An apparatus according to claim 22, wherein said plurality of correcting means are a plurality of color masking circuits and have at least two kinds of color masking circuits such as circuit which includes a black signal as an input signal of said color masking circuit and circuit which does not include the black signal.

25. An apparatus according to claim 22, wherein said synthesizing means linearly couples and synthesizes outputs of said plurality of correcting means.

26. An apparatus according to claim 23, wherein said control means calculates the ratio by using membership functions on the basis of an output from said detecting means.

27. An apparatus according to claim 1, wherein the membership functions are plurally stored in said memory means with respect to each of the first and second parameters.

28. An apparatus according to claim 1, wherein the membership functions show a probability that the first or second parameter represents a predetermined characteristic.

29. An apparatus according to claim 9, wherein the membership functions are plurally stored in said memory means with respect to each of the first and second parameters.

30. An apparatus according to claim 9, wherein the membership functions show a probability that the first or second parameter represents a predetermined characteristic.

* * * * *

UNITED STATES PATENT AND TRADEMARK OFFICE
CERTIFICATE OF CORRECTION

PATENT NO. : 5,339,365
DATED : August 16, 1994
INVENTOR(S) : TAKASHI KAWAI ET AL.   Page 1 of 3

It is certified that error appears in the above-identified patent and that said Letters Patent is hereby corrected as shown below:

COLUMN 2

Line 23, "skin color," should read --flesh tints,--.
Line 32, "skin color," should read --flesh tints,--.

COLUMN 4

Line 46, "of" should read --of a--.
Line 58, "by" should read --by means of--.

COLUMN 6

Line 44, "is," should read --that is,-- and "that" should be deleted.
Line 64, "circuit" should read --circuit (106 to 108)-- and "execute" should read --execute the--.

COLUMN 8

Line 8, "area" should read --area;--.

COLUMN 9

Line 44, "3 17" should read --317--.

UNITED STATES PATENT AND TRADEMARK OFFICE
CERTIFICATE OF CORRECTION

PATENT NO. : 5,339,365
DATED : August 16, 1994
INVENTOR(S) : TAKASHI KAWAI ET AL.                Page 2 of 3

It is certified that error appears in the above-identified patent and that said Letters Patent is hereby corrected as shown below:

COLUMN 11

Line 56, "303" should read --1303--.

COLUMN 12

Line 59, "hereinbelow." should read --hereinbelow:--.

COLUMN 13

Line 27, "(9)." should read --(9):--.

COLUMN 14

Line 47, "follows." should read --follows:--.
Line 59, "I(1104)" should read --(1104)--.

COLUMN 16

Line 18, "132 7" should read --1327--.

UNITED STATES PATENT AND TRADEMARK OFFICE
CERTIFICATE OF CORRECTION

PATENT NO. : 5,339,365
DATED : August 16, 1994
INVENTOR(S) : TAKASHI KAWAI ET AL.   Page 3 of 3

It is certified that error appears in the above-identified patent and that said Letters Patent is hereby corrected as shown below:

COLUMN 20

Line 43, "as" should read --as a--.
    Line 44, "and" should read --and a--.

Signed and Sealed this

Twenty-fourth Day of January, 1995

Attest:

BRUCE LEHMAN

Attesting Officer    Commissioner of Patents and Trademarks